(12) United States Patent
Marsico

(10) Patent No.: US 8,547,908 B2
(45) Date of Patent: *Oct. 1, 2013

(54) METHODS, SYSTEMS, AND COMPUTER READABLE MEDIA FOR ENRICHING A DIAMETER SIGNALING MESSAGE

(75) Inventor: Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,352

(22) Filed: Mar. 5, 2012

(65) Prior Publication Data

US 2012/0224524 A1  Sep. 6, 2012

Related U.S. Application Data

(60) Provisional application No. 61/448,953, filed on Mar. 3, 2011.

(51) Int. Cl.
*H04Q 7/00* (2006.01)

(52) U.S. Cl.
USPC ............................ 370/328; 370/329; 370/522

(58) Field of Classification Search
USPC ................. 370/315, 328, 329, 522; 455/515, 455/466; 709/206
See application file for complete search history.

(56) References Cited

U.S. PATENT DOCUMENTS

| | | | |
|---|---|---|---|
| 1,872,857 A | 4/1931 | Wesson et al. |
| 5,228,083 A | 7/1993 | Lozowick et al. |
| 5,719,861 A | 2/1998 | Okanoue |
| 5,799,073 A | 8/1998 | Fleischer, III et al. |
| 5,802,145 A | 9/1998 | Farris et al. |
| 5,903,726 A | 5/1999 | Donovan et al. |
| 5,915,222 A | 6/1999 | Olsson et al. |
| 5,995,822 A | 11/1999 | Smith et al. |
| 6,078,584 A | 6/2000 | Mottishaw et al. |
| 6,122,352 A | 9/2000 | Kangas et al. |

(Continued)

FOREIGN PATENT DOCUMENTS

| CN | ZL 200780017383.1 | 11/2011 |
|---|---|---|
| EP | 1 134 939 A1 | 9/2001 |

(Continued)

OTHER PUBLICATIONS

Notification of Transmittal of the internation Search Report and the Written Opinion of the International Searching Authority, or the Declaration for International Patent Application No. PCT/US2012/027736 (Jun. 12, 2012).

(Continued)

*Primary Examiner* — Chuong T Ho
(74) *Attorney, Agent, or Firm* — Jenkins, Wilson, Taylor & Hunt, P.A.

(57) ABSTRACT

Methods, systems, and computer readable media for enriching a Diameter signaling message are disclosed. In one example, the method comprises receiving, at a Diameter routing node, a Diameter signaling message that is associated with a mobile subscriber and includes mobile subscriber related information and querying a Diameter binding repository (DBR) using the mobile subscriber related information to select a network service node from a plurality of network service nodes configured to process the Diameter signaling message. The method further includes obtaining DBR information associated with the mobile subscriber from the DBR, wherein the DBR information includes an identifier associated with the selected network service node and modifying the Diameter signaling message to include at least a portion of the DBR information.

29 Claims, 6 Drawing Sheets

(56) References Cited

U.S. PATENT DOCUMENTS

| | | | |
|---|---|---|---|
| 6,157,621 A | 12/2000 | Brown et al. |
| 6,175,743 B1 | 1/2001 | Alperovich et al. |
| 6,185,414 B1 | 2/2001 | Brunner et al. |
| 6,188,752 B1 | 2/2001 | Lesley |
| 6,208,872 B1 | 3/2001 | Schmidt |
| 6,273,622 B1 | 8/2001 | Ben-David |
| 6,292,669 B1 | 9/2001 | Meuronen et al. |
| 6,298,383 B1 | 10/2001 | Gutman et al. |
| 6,304,273 B1 | 10/2001 | Bonnet |
| 6,351,453 B1 | 2/2002 | Nolting et al. |
| 6,373,930 B1 | 4/2002 | McConnell et al. |
| 6,393,269 B1 | 5/2002 | Hartmaier et al. |
| 6,430,277 B1 | 8/2002 | Roadifer et al. |
| 6,453,158 B2 | 9/2002 | Donovan et al. |
| 6,480,588 B1 | 11/2002 | Donovan |
| 6,496,690 B1 | 12/2002 | Cobo et al. |
| 6,512,926 B1 | 1/2003 | Henry-Labordere |
| 6,516,194 B2 | 2/2003 | Hanson |
| 6,519,468 B1 | 2/2003 | Donovan et al. |
| 6,535,727 B1 | 3/2003 | Abbasi et al. |
| 6,535,746 B1 | 3/2003 | Yu et al. |
| 6,584,073 B1 | 6/2003 | Steele, Jr. et al. |
| 6,584,183 B2 | 6/2003 | Manto |
| 6,611,516 B1 | 8/2003 | Pirkola et al. |
| 6,625,461 B1 | 9/2003 | Bertacchi |
| 6,633,764 B1 | 10/2003 | Garcia |
| 6,662,017 B2 | 12/2003 | McCann et al. |
| 6,694,153 B1 | 2/2004 | Campbell et al. |
| 6,697,620 B1 | 2/2004 | Lamb et al. |
| 6,745,041 B2 | 6/2004 | Allison et al. |
| 6,795,546 B2 | 9/2004 | Delaney et al. |
| 6,801,781 B1 | 10/2004 | Provost et al. |
| 6,819,652 B1 | 11/2004 | Akhtar et al. |
| 6,819,932 B2 | 11/2004 | Allison et al. |
| 6,826,397 B1 | 11/2004 | Vasa |
| 6,850,768 B2 | 2/2005 | Foll |
| 6,856,676 B1 | 2/2005 | Pirot et al. |
| 6,865,153 B1 | 3/2005 | Hill et al. |
| 6,865,191 B1 | 3/2005 | Bengtsson et al. |
| 6,912,389 B2 | 6/2005 | Bright et al. |
| 6,915,345 B1 | 7/2005 | Tummala et al. |
| 6,918,041 B1 | 7/2005 | Chen |
| 6,954,790 B2 | 10/2005 | Forslöw |
| 6,967,956 B1 | 11/2005 | Tinsley et al. |
| 6,975,852 B1 | 12/2005 | Sofer et al. |
| 7,039,037 B2 | 5/2006 | Wang et al. |
| 7,042,877 B2 | 5/2006 | Foster et al. |
| 7,043,000 B2 | 5/2006 | Delaney et al. |
| 7,113,800 B2 | 9/2006 | Linkola |
| 7,136,635 B1 | 11/2006 | Bharatia et al. |
| 7,145,875 B2 | 12/2006 | Allison et al. |
| 7,181,194 B2 | 2/2007 | McCann et al. |
| 7,190,959 B2 | 3/2007 | Palmer et al. |
| 7,254,391 B2 | 8/2007 | McCann |
| 7,257,401 B1 | 8/2007 | Dizdarevic et al. |
| 7,257,636 B2 | 8/2007 | Lee et al. |
| 7,286,516 B2 | 10/2007 | Delaney et al. |
| 7,292,592 B2 * | 11/2007 | Rune | 370/401 |
| 7,298,725 B2 | 11/2007 | Rune |
| 7,310,415 B1 | 12/2007 | Short |
| 7,333,438 B1 | 2/2008 | Rabie et al. |
| 7,333,482 B2 | 2/2008 | Johansson et al. |
| 7,333,809 B2 | 2/2008 | Engelhart |
| 7,346,022 B1 | 3/2008 | Roy |
| 7,383,298 B2 | 6/2008 | Palmer et al. |
| 7,397,773 B2 | 7/2008 | Qu et al. |
| 7,401,217 B2 | 7/2008 | Huang et al. |
| 7,403,492 B2 | 7/2008 | Zeng et al. |
| 7,403,537 B2 | 7/2008 | Allison et al. |
| 7,457,875 B2 | 11/2008 | Wada et al. |
| 7,466,807 B2 | 12/2008 | McCann et al. |
| 7,471,634 B1 | 12/2008 | Wenzel et al. |
| 7,551,608 B1 | 6/2009 | Roy |
| 7,551,926 B2 * | 6/2009 | Rune | 455/435.1 |
| 7,567,796 B2 | 7/2009 | Tammi et al. |
| 7,583,963 B2 | 9/2009 | Tammi et al. |
| 7,590,732 B2 | 9/2009 | Rune |
| 7,613,121 B2 | 11/2009 | Chou et al. |
| 7,633,872 B2 | 12/2009 | Pitcher et al. |
| 7,633,969 B2 | 12/2009 | Caugherty et al. |
| 7,647,403 B2 | 1/2010 | Gray |
| 7,660,320 B2 | 2/2010 | Wepiwe et al. |
| 7,672,332 B1 | 3/2010 | Chapman |
| 7,706,343 B2 | 4/2010 | Delaney et al. |
| 7,729,485 B2 | 6/2010 | Koskinen et al. |
| 7,764,947 B2 | 7/2010 | Koskinen et al. |
| 7,792,981 B2 | 9/2010 | Taylor |
| 7,813,326 B1 | 10/2010 | Kelm et al. |
| 7,822,023 B2 | 10/2010 | Lahetkangas et al. |
| 7,840,699 B2 | 11/2010 | Fujita et al. |
| 7,848,767 B2 | 12/2010 | McCann et al. |
| 7,855,982 B2 | 12/2010 | Ramankutty et al. |
| 7,876,744 B2 | 1/2011 | Kwon |
| 7,889,716 B2 | 2/2011 | Tejani et al. |
| 7,894,353 B2 | 2/2011 | Li et al. |
| 7,898,957 B2 | 3/2011 | Lea et al. |
| 7,916,685 B2 | 3/2011 | Schaedler et al. |
| 7,916,857 B2 | 3/2011 | Palmer et al. |
| 7,921,290 B2 | 4/2011 | Albert et al. |
| 7,936,866 B2 | 5/2011 | McCann |
| 7,944,853 B2 | 5/2011 | Eglin et al. |
| 7,957,355 B1 | 6/2011 | Heiferling et al. |
| 7,961,685 B2 | 6/2011 | Suh et al. |
| 7,996,007 B2 | 8/2011 | Bantukul |
| 7,996,541 B2 | 8/2011 | Marathe et al. |
| 8,015,293 B2 | 9/2011 | Schaedler et al. |
| 8,041,021 B2 | 10/2011 | Xu et al. |
| 8,045,983 B2 | 10/2011 | Bantukul |
| 8,059,533 B2 | 11/2011 | Andreasen et al. |
| 8,060,612 B1 | 11/2011 | Mangal et al. |
| 8,068,408 B2 | 11/2011 | Ansari et al. |
| 8,089,958 B2 | 1/2012 | Elliott et al. |
| 8,139,735 B2 | 3/2012 | Cai et al. |
| 8,160,021 B2 | 4/2012 | Ohba et al. |
| 8,165,143 B2 | 4/2012 | Samajpati |
| 8,170,035 B2 | 5/2012 | Furey et al. |
| 8,170,055 B2 | 5/2012 | Fang et al. |
| 8,213,409 B2 | 7/2012 | Rudnick et al. |
| 8,213,411 B2 | 7/2012 | Ayers et al. |
| 8,219,697 B2 | 7/2012 | Langen et al. |
| 8,223,717 B2 | 7/2012 | Dillon et al. |
| 8,391,833 B2 | 3/2013 | Agarwal |
| 2001/0006897 A1 | 7/2001 | Kang et al. |
| 2001/0024443 A1 | 9/2001 | Alriksson et al. |
| 2002/0029189 A1 | 3/2002 | Titus et al. |
| 2002/0049901 A1 | 4/2002 | Carvey |
| 2002/0051427 A1 | 5/2002 | Carvey |
| 2002/0071530 A1 | 6/2002 | Hannigan |
| 2002/0087723 A1 | 7/2002 | Williams et al. |
| 2002/0111153 A1 | 8/2002 | Hartmaier et al. |
| 2002/0132636 A1 | 9/2002 | Stockhusen |
| 2002/0133494 A1 | 9/2002 | Goedken |
| 2002/0133534 A1 | 9/2002 | Forslow |
| 2002/0141346 A1 | 10/2002 | Garcia-Luna-Aceves et al. |
| 2002/0147845 A1 | 10/2002 | Sanchez-Herrero |
| 2002/0150079 A1 | 10/2002 | Zabawskyj et al. |
| 2002/0176382 A1 | 11/2002 | Madour et al. |
| 2002/0181507 A1 | 12/2002 | Jones |
| 2002/0194378 A1 | 12/2002 | Foti |
| 2002/0196775 A1 | 12/2002 | Tuohino et al. |
| 2003/0003930 A1 | 1/2003 | Allison et al. |
| 2003/0007482 A1 | 1/2003 | Khello et al. |
| 2003/0040280 A1 | 2/2003 | Koskelainen |
| 2003/0065788 A1 | 4/2003 | Salomaki |
| 2003/0091170 A1 | 5/2003 | McCann et al. |
| 2003/0095536 A1 | 5/2003 | Hu et al. |
| 2003/0115358 A1 | 6/2003 | Yun |
| 2003/0131151 A1 | 7/2003 | Roach et al. |
| 2003/0142803 A1 | 7/2003 | Freedman et al. |
| 2003/0157938 A1 | 8/2003 | Haase et al. |
| 2003/0190913 A1 | 10/2003 | Coad et al. |
| 2003/0203740 A1 | 10/2003 | Bahl et al. |
| 2004/0037278 A1 | 2/2004 | Wong et al. |
| 2004/0042485 A1 | 3/2004 | Gettala et al. |

| | | |
|---|---|---|
| 2004/0076126 A1 | 4/2004 | Qu et al. |
| 2004/0098612 A1 | 5/2004 | Lee et al. |
| 2004/0103157 A1 | 5/2004 | Requena et al. |
| 2004/0152469 A1 | 8/2004 | Yla-Outinen et al. |
| 2004/0166878 A1 | 8/2004 | Erskine et al. |
| 2004/0176086 A1 | 9/2004 | Chatterjee et al. |
| 2004/0184594 A1 | 9/2004 | Schmechel et al. |
| 2004/0203641 A1 | 10/2004 | Hazlewood |
| 2004/0205212 A1 | 10/2004 | Huotari et al. |
| 2004/0213393 A1 | 10/2004 | Bedingfiled et al. |
| 2004/0223489 A1 | 11/2004 | Rotsten et al. |
| 2004/0225878 A1 | 11/2004 | Costa-Requena et al. |
| 2004/0233840 A1 | 11/2004 | Bye |
| 2004/0240638 A1 | 12/2004 | Donovan |
| 2004/0246965 A1 | 12/2004 | Westman et al. |
| 2005/0002417 A1 | 1/2005 | Kelly et al. |
| 2005/0007984 A1 | 1/2005 | Shaheen et al. |
| 2005/0058125 A1 | 3/2005 | Mutikainen et al. |
| 2005/0078642 A1 | 4/2005 | Mayer et al. |
| 2005/0094594 A1 | 5/2005 | Roh |
| 2005/0099964 A1 | 5/2005 | Delaney et al. |
| 2005/0124341 A1 | 6/2005 | Myllymaki et al. |
| 2005/0155036 A1 | 7/2005 | Tiainen et al. |
| 2005/0159156 A1 | 7/2005 | Bajko et al. |
| 2005/0197105 A1 | 9/2005 | McCann |
| 2005/0232236 A1 | 10/2005 | Allison et al. |
| 2005/0232407 A1 | 10/2005 | Craig et al. |
| 2005/0235000 A1 | 10/2005 | Keil |
| 2005/0235065 A1 | 10/2005 | Le et al. |
| 2005/0246545 A1 | 11/2005 | Reiner |
| 2005/0246716 A1 | 11/2005 | Smith et al. |
| 2006/0020680 A1 | 1/2006 | Emberty et al. |
| 2006/0025114 A1 | 2/2006 | Bales et al. |
| 2006/0030320 A1 | 2/2006 | Tammi et al. |
| 2006/0034256 A1 | 2/2006 | Addagatla et al. |
| 2006/0045249 A1 | 3/2006 | Li et al. |
| 2006/0050680 A1 | 3/2006 | Naim et al. |
| 2006/0068816 A1 | 3/2006 | Pelaez et al. |
| 2006/0077926 A1* | 4/2006 | Rune ............... 370/328 |
| 2006/0078119 A1 | 4/2006 | Jee et al. |
| 2006/0098621 A1 | 5/2006 | Plata et al. |
| 2006/0101159 A1 | 5/2006 | Yeh et al. |
| 2006/0104210 A1 | 5/2006 | Nielsen |
| 2006/0123477 A1 | 6/2006 | Raghavan et al. |
| 2006/0136557 A1 | 6/2006 | Schaedler et al. |
| 2006/0161512 A1 | 7/2006 | Schaedler et al. |
| 2006/0172730 A1* | 8/2006 | Matsuda ............... 455/420 |
| 2006/0177007 A1 | 8/2006 | Vaghar et al. |
| 2006/0200670 A1 | 9/2006 | Kuffel et al. |
| 2006/0221972 A1* | 10/2006 | Bhargava et al. ........ 370/392 |
| 2006/0240819 A1 | 10/2006 | Xu et al. |
| 2006/0252425 A1 | 11/2006 | Jiang |
| 2006/0253563 A1 | 11/2006 | Yang et al. |
| 2006/0258329 A1 | 11/2006 | Gruchala et al. |
| 2006/0259759 A1 | 11/2006 | Maino et al. |
| 2006/0274744 A1* | 12/2006 | Nagai et al. ............... 370/389 |
| 2006/0291486 A1 | 12/2006 | Cai et al. |
| 2007/0042779 A1 | 2/2007 | Eikkula |
| 2007/0047539 A1 | 3/2007 | Agarwal et al. |
| 2007/0066326 A1 | 3/2007 | Agarwal et al. |
| 2007/0121596 A1 | 5/2007 | Kurapati et al. |
| 2007/0127647 A1 | 6/2007 | Russell |
| 2007/0153995 A1 | 7/2007 | Fang et al. |
| 2007/0168421 A1 | 7/2007 | Kalyanpur et al. |
| 2007/0214209 A1 | 9/2007 | Maeda |
| 2007/0230680 A1 | 10/2007 | McCann |
| 2007/0242637 A1 | 10/2007 | Dynarski et al. |
| 2007/0254681 A1 | 11/2007 | Horvath et al. |
| 2007/0263565 A1 | 11/2007 | Roy |
| 2007/0280447 A1 | 12/2007 | Cai et al. |
| 2007/0286367 A1 | 12/2007 | McCann et al. |
| 2007/0297419 A1 | 12/2007 | Askerup et al. |
| 2008/0025230 A1 | 1/2008 | Patel et al. |
| 2008/0039104 A1 | 2/2008 | Gu et al. |
| 2008/0144602 A1 | 6/2008 | Casey |
| 2008/0151906 A1 | 6/2008 | Kolli et al. |
| 2008/0160954 A1 | 7/2008 | Agarwal et al. |
| 2008/0167035 A1 | 7/2008 | Buckley et al. |
| 2008/0178277 A1 | 7/2008 | Oba et al. |
| 2008/0212576 A1 | 9/2008 | O'Neill |
| 2008/0248820 A1 | 10/2008 | Lohtia |
| 2008/0301162 A1 | 12/2008 | Wall et al. |
| 2008/0317247 A1 | 12/2008 | Jeong et al. |
| 2009/0041043 A1 | 2/2009 | Belling et al. |
| 2009/0080440 A1* | 3/2009 | Balyan et al. ............... 370/400 |
| 2009/0083861 A1 | 3/2009 | Jones |
| 2009/0129271 A1* | 5/2009 | Ramankutty et al. ......... 370/235 |
| 2009/0138619 A1 | 5/2009 | Schnizlein et al. |
| 2009/0185494 A1 | 7/2009 | Li et al. |
| 2009/0193071 A1 | 7/2009 | Qiu et al. |
| 2009/0196231 A1 | 8/2009 | Giaretta et al. |
| 2009/0196290 A1 | 8/2009 | Zhao et al. |
| 2009/0232011 A1* | 9/2009 | Li et al. ............... 370/248 |
| 2009/0264097 A1 | 10/2009 | Cai et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0017846 A1 | 1/2010 | Huang et al. |
| 2010/0135287 A1 | 6/2010 | Hosain et al. |
| 2010/0251330 A1 | 9/2010 | Kroeselberg et al. |
| 2010/0265948 A1 | 10/2010 | Patel et al. |
| 2010/0290392 A1 | 11/2010 | Rasanen et al. |
| 2010/0291923 A1 | 11/2010 | Zhou et al. |
| 2010/0299451 A1* | 11/2010 | Yigang et al. ............... 709/241 |
| 2010/0311392 A1 | 12/2010 | Stenfelt et al. |
| 2010/0331023 A1 | 12/2010 | Cai et al. |
| 2011/0026460 A1 | 2/2011 | Alvarez et al. |
| 2011/0060830 A1 | 3/2011 | Kang et al. |
| 2011/0075675 A1 | 3/2011 | Koodli et al. |
| 2011/0082940 A1 | 4/2011 | Montemurro et al. |
| 2011/0116378 A1* | 5/2011 | Ramankutty et al. ......... 370/235 |
| 2011/0116382 A1* | 5/2011 | McCann et al. ............... 370/241 |
| 2011/0165901 A1 | 7/2011 | Baniel et al. |
| 2011/0188397 A1 | 8/2011 | McCann et al. |
| 2011/0199895 A1 | 8/2011 | Kanode et al. |
| 2011/0199906 A1 | 8/2011 | Kanode et al. |
| 2011/0200047 A1 | 8/2011 | McCann et al. |
| 2011/0200053 A1* | 8/2011 | Kanode et al. ............... 370/401 |
| 2011/0200054 A1 | 8/2011 | Craig et al. |
| 2011/0202604 A1 | 8/2011 | Craig et al. |
| 2011/0202612 A1* | 8/2011 | Craig et al. ............... 709/206 |
| 2011/0202613 A1 | 8/2011 | Craig et al. |
| 2011/0202614 A1* | 8/2011 | Graig et al. ............... 709/206 |
| 2011/0202676 A1* | 8/2011 | Craig et al. ............... 709/238 |
| 2011/0202677 A1 | 8/2011 | Craig et al. |
| 2011/0202684 A1 | 8/2011 | Craig et al. |
| 2011/0225113 A1 | 9/2011 | Mann |
| 2011/0225280 A1* | 9/2011 | Delsesto et al. ............... 709/223 |
| 2011/0225306 A1* | 9/2011 | Delsesto et al. ............... 709/227 |
| 2011/0238793 A1 | 9/2011 | Bedare et al. |
| 2011/0282904 A1 | 11/2011 | Schaedler et al. |
| 2011/0302244 A1* | 12/2011 | McCann et al. ............... 709/204 |
| 2011/0314178 A1* | 12/2011 | Kanode et al. ............... 709/238 |
| 2012/0005357 A1 | 1/2012 | Hellgren |
| 2012/0005523 A1 | 1/2012 | Korhonen et al. |
| 2012/0096177 A1 | 4/2012 | Rasanen |
| 2012/0099715 A1 | 4/2012 | Ravishankar et al. |
| 2012/0134361 A1 | 5/2012 | Wong et al. |
| 2012/0155389 A1* | 6/2012 | McNamee et al. ............ 370/328 |
| 2012/0155470 A1 | 6/2012 | McNamee et al. |
| 2012/0158995 A1 | 6/2012 | McNamee et al. |
| 2012/0163297 A1 | 6/2012 | Agarwal et al. |
| 2012/0202550 A1* | 8/2012 | Marsico ............... 455/515 |
| 2012/0224531 A1 | 9/2012 | Karuturi et al. |
| 2012/0225679 A1 | 9/2012 | McCann et al. |
| 2012/0226758 A1 | 9/2012 | Sprague et al. |
| 2012/0226814 A1 | 9/2012 | Stucker |
| 2012/0239771 A1 | 9/2012 | Rasanen |
| 2012/0287844 A1 | 11/2012 | Ophir et al. |
| 2012/0311064 A1 | 12/2012 | Deo |

FOREIGN PATENT DOCUMENTS

| | | |
|---|---|---|
| EP | 1 328 102 A1 | 7/2003 |
| EP | 1 357 720 A1 | 10/2003 |
| EP | 1 465 385 A1 | 10/2004 |
| EP | 1 314 324 B1 | 8/2008 |
| EP | 2 242 205 A1 | 10/2010 |
| EP | 2 220 841 B1 | 9/2011 |

| | | | |
|---|---|---|---|
| EP | 1 847 076 B1 | 2/2012 | |
| EP | 1 846 832 B1 | 4/2012 | |
| GB | 2 382 267 | 5/2003 | |
| WO | WO 01/22761 | 3/2001 | |
| WO | WO 02/054786 A1 | 7/2002 | |
| WO | WO 03/005664 A2 | 1/2003 | |
| WO | WO 03/017697 A1 | 2/2003 | |
| WO | WO 03/103265 A1 | 12/2003 | |
| WO | WO 2004/008786 A1 | 1/2004 | |
| WO | 1 558 004 A | 7/2005 | |
| WO | WO 2005/089119 A2 | 9/2005 | |
| WO | WO 2006/031678 A2 | 3/2006 | |
| WO | WO 2006/066149 A2 | 6/2006 | |
| WO | WO 2007/050589 A2 | 5/2007 | |
| WO | WO 2007/064943 A2 | 6/2007 | |
| WO | WO 2007/106563 A2 | 9/2007 | |
| WO | WO 2008/085432 A1 | 7/2008 | |
| WO | WO 2008/087633 A2 | 7/2008 | |
| WO | WO 2009/058067 A1 | 5/2009 | |
| WO | WO 2009/070179 A1 | 6/2009 | |
| WO | WO 2009/134265 A1 | 11/2009 | |
| WO | 2 716 544 A1 | 12/2010 | |
| WO | WO 2010/139360 A1 | 12/2010 | |
| WO | WO 2011/082090 A2 | 7/2011 | |
| WO | WO 2011/100587 A2 | 8/2011 | |
| WO | WO 2011/100594 A2 | 8/2011 | |
| WO | WO 2011/100600 A2 | 8/2011 | |
| WO | WO 2011/100603 A2 | 8/2011 | |
| WO | WO 2011/100606 A2 | 8/2011 | |
| WO | WO 2011/100609 A2 | 8/2011 | |
| WO | WO 2011/100610 A2 | 8/2011 | |
| WO | WO 2011/100612 A2 | 8/2011 | |
| WO | WO 2011/100615 A2 | 8/2011 | |
| WO | WO 2011/100621 A2 | 8/2011 | |
| WO | WO 2011/100626 A2 | 8/2011 | |
| WO | WO 2011/100629 A2 | 8/2011 | |
| WO | WO 2011/100630 A2 | 8/2011 | |
| WO | WO 2011/156274 A2 | 12/2011 | |
| WO | WO 2011/1159799 A2 | 12/2011 | |
| WO | WO 2012/088497 A1 | 6/2012 | |
| WO | WO 2012/106710 A1 | 8/2012 | |
| WO | WO 2012/118959 A1 | 9/2012 | |
| WO | WO 2012/118963 A1 | 9/2012 | |
| WO | WO 2012/118967 A1 | 9/2012 | |
| WO | WO 2012/154674 A2 | 11/2012 | |

OTHER PUBLICATIONS

Notification of Transmittal of the Internation Search Report and the Written Opinion of the International Searching Authority, or the Declaration for International Patent Application No. PCT/US2012/023971 (Jun. 11, 2012).

Commonly Assigned Co-pending U.S. Appl. No. 13/366,928 titled "Methods, Systems, and Computer Readable Media for Provisioning a Diameter Binding Repository," (unpublished, filed Feb. 6, 2012).

Calhoun et al., "Diameter Base Protcol," Network Working Group, RFC 3588 (Sep. 2003).

Notification of Transmital of the International Search Report and the Written Opinion of the International Searching Authority, or the Declaration for International Patent Application No. PCT/US2012/027281 (Jun. 15, 2012).

Notification of Transmittal of the International Search Report and the Written Opinion of the International Searching Authority, or the Declaration for International Application No. PCT/US2012/027263 (Jun. 14, 2012).

Notification of Transmittal of the Internation Search Report and the Written Opinion of the International Searching Authority, or the Declaration for International Patent Application No. PCT/US2012/027269 (Jun. 11, 2012).

Commonly Assigned, Co-pending International Application No. PCT/US12/27281 for "Methods, Systems, and Computer Readable Media for Hybrid Session Based Diameter Routing", (Unpublished, filed Mar. 1, 2012).

Commonly Assigned Co-pending U.S. Appl. No. 13/409,949 titled "Methods, Systems, and Computer Readable Media for Hybrid Session Based Diameter Routing," (unpublished, filed Mar. 1, 2012).

Commonly Assigned, Co-pending International Application No. PCT/US12/27269 for "Methods, Systems, and Computer Readable Media for Dynamically Learning Diameter Binding Information", (Unpublished, filed Mar. 1, 2012).

Commonly Assigned Co-pending U.S. Appl. No. 13/409,914 titled "Methods, Systems, and Computer Readable Media for Dynamically Learning Diameter Binding Information," (unpublished, filed Mar. 1, 2012).

Commonly Assigned, Co-pending International Application No. PCT/US12/27263 for "Methods, Systems, and Computer Readable Media for Sharing Diameter Binding Data", (Unpublished, filed Mar. 1, 2012).

Commonly Assigned, Co-pending U.S. Appl. No. 13/409,893 for "Methods, Systems, and Computer Readable Media for Sharing Diameter Binding Data", (Unpublished, filed Mar. 1, 2012).

Notification of Transmittal of the International Search Report and the Written Opinion of the International Searching Authority, or the Declaration for International Application No. PCT/US2011/039285 (Feb. 9, 2012).

Commonly Assigned, Co-pending International Application No. PCT/US12/23971 for "Methods, Systems, and Computer Readable Media for Provisioning a Diameter Binding Repository", (Unpublished, filed Feb. 6, 2012).

Notification of the Transmittal of the International Search Report and the Written Opinion of the International Searching Authority, or the Declaration for International Application No. PCT/US2010/061934 (Oct. 25, 2011).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011)

3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).

"3rd Generation Partnership Project; Technical Specification Group Services and System Aspect; Telecommunication management; Charging management; Diameter charging applications (Release 9),"3GPP TS 32.29. V9.4.0 (Jun. 2010).

"3rd Generation Partnership Project; Technical Specification Group Services and System Aspect; Telecommunication management; Charging management; Charging architecture and principles (Release 9)," 3GPP TS 32.240, V9.1.0 (Jun. 2010).

Znaty, "Diameter, GPRS, (LTE + ePC = EPS) IMS, PCC and SDM," EFFORT, pp. 1-229 (Part 1 of 2) (May 2010).

Znaty, "Diameter, GPRS, (LTE + ePC = EPS) IMS, PCC and SDM," EFFORT, pp. 230-461 (Part 2 of 2) (May 2010).

3GPP, "3rd Generation Partnership Project; Technical Specification Group Core Network and Terminals; Policy and Charging Control signalling flows and Quality of Service (QoS) Parameter mapping (Release 9)," 3Rd Generation Partnership Project, TS 29.213 V9.2.0, pp. 1-129 (Mar. 2010).

"3rd Generation Partnership Project; Technical Specification Group Core Network and Terminals; Policy and Charging Control over Gx reference point (Release 9)," 3GPP TS 29.212 V9.2.0 (Mar. 2010).

Notice of Allowance and Fee(s) Due for U.S. Appl. No. 13/336,132 (May 20, 2013).

Notice of Allowance and Fee(s) Due for U.S. Appl. No. 11/890,299 (Mar. 26, 2013).

Extended European Search Report for European Application No. 07753190.3 (Feb. 22, 2013).

First Examination Report for Indian Application No. 3231/CHENP/2008 (Jan. 2, 2013).

Non-Final Office Action for U.S. Appl. No. 13/336,132 (Dec. 18, 2012).

Second Office Action for Chinese Patent Application No. 200780051876.7 (Dec. 5, 2012).

Notice of Allowance and Fee(s) Due for U.S. Appl. No. 13/205,184 (Nov. 1, 2012).

Notification of Transmittal of the International Search Report and the Written Opinion of the International Searching Authority, or the Declaration for International Application No. PCT/US2001/167130 (Jun. 7, 2012).
Communication pursuant to Article 94(3) EPC for European Application No. 05 724 466.7 (Apr. 10, 2012).
First Office Action for Chinese Patent Application No. 200780051876,7 (Mar. 7, 2012).
Notice of Abandonment for U.S. Appl. No. 11/586,488 (Jan. 31, 2012).
Communication under Rule 71(3) EPC for European Application No. 06 844 747.3 (Jul. 19, 2011).
Non-Final Official Action for U.S. Appl. No. 11/586,488 (Jul. 15, 2011).
Notice of Allowance for Chinese Patent Application No. 200780017383.1 (Jun. 24, 2011).
Extended European Search Report for European Application No. 05724466.7 (Jun. 20, 2011).
Interview Summary for U.S. Appl. No. 11/586,488 (May 6, 2011).
Non-Final Official Action for U.S. Appl. No. 11/586,488 (Jan. 31, 2011).
First Office Action for Chinese Patent Application No. 200780017383.1 (Dec. 31, 2010).
Chinese Official Action for Chinese Patent Application No. 200680051295.9 (Dec. 24, 2010).
Notice of Allowance and Fee(s) Due for U.S. Appl. No. 11/807,691 (Dec. 23, 2010).
Final Official Action for U.S. Appl. No. 11/890,299 (Dec. 9, 2010).
Notice of Allowance and Fee(s) Due for U.S. Appl. No. 11/291,502 (Oct. 5, 2010).
Notice of Allowance and Fee(s) Due for U.S. Appl. No. 10/405,859 (Aug. 5, 2010).
Communication Pursuant to Article 94(3) EPC for European Application No. 06844747.3 (May 11, 2010).
Non-Final Official Action for U.S. Appl. No. 11/890,299 (Apr. 15, 2010).
Notice of Allowance and Fee(s) Due for U.S. Appl. No. 10/405,859 (Mar. 9, 2010).
Final Official Action for U.S. Appl. No. 11/291,502 (Feb. 4, 2010).
U.S. Appl. No. 61/291,961 for "A GTP Relay for Direct Internet Access from the Roaming Mobile Network and Other Services," (Unpublished, filed Jan. 4, 2010).
Final Official Action for U.S. Appl. No. 11/807,691 (Dec. 7, 2009).
Korhonen et al., "Clarifications on the Routing of Diameter Requests Based on the Username and the Realm," RFC 5729, pp. 1-12 (Dec. 2009).
Korhonen et al., "Diameter Username and the Realm Based Request Routing Clarifications," draft-ietf-dime-nai-routing-04.txt, pp. 1-13 (Oct. 6, 2009).
Official Action for U.S. Appl. No. 10/405,859 (Aug. 3, 2009).
Communication pursuant to Article 94(3) EPC for European application No. 06844747.3 (Jul. 28, 2009).
Official Action for U.S. Appl. No. 11/291,502 (May 13, 2009).
Supplementary European Search Report for European Application No. 06844747.3 (Apr. 24, 2009).
Non-Final Official Action for U.S. Appl. No. 11/807,691 (Apr. 2, 2009).
Final Official Action for U.S. Appl. No. 10/405,859 (Jan. 6, 2009).
Declaration of Gregory A. Hunt (Dec. 15, 2008).
Communication of European publication Number and information on the application of Article 67(3) EPC for European Application No. 07753190.3 (Nov. 12, 2008).
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Notification of Transmittal of the International Search Report and the Written Opinion of the International Searching Authority, or the Declaration for International Application No. PCT/US07/06543 (Aug. 29, 2008).
Final Official Action for U.S. Appl. No. 11/807,691 (Aug. 21, 2008).
Interview Summary for U.S. Appl. No. 10/405,859 (Aug. 20, 2008).
Notice of Allowance and Fee(s) Due for U.S. Appl. No. 11/724,590 (Aug. 14, 2008).
Communication of European publication number and information on the application of Article 67(3) EPC for Application No. 06844747.3 (Jul. 23, 2008).
Notification of Transmittal of the International Search Report and the Written Opinion of the International Searching Authority, or the Declaration for International Application No. PCT/US07/26232 (May 15, 2008).
Interview Summary for U.S. Appl. No. 11/807,691 (Apr. 11, 2008).
Official Action for U.S. Appl. No. 10/405,859 (Mar. 17, 2008).
Restriction Requirement for U.S. Appl. No. 10/405,859 (Feb. 6, 2008).
Non-Final Official Action for U.S. Appl. No. 11/807,691 (Dec. 21, 2007).
"3rd Generation Partnership Project; Technical Specifications Group Service and System Aspects; Telecommunication management; Charging management; Diameter charging applications (Release 7)," 3GPP TS 32.299, V7.7.0 pp. 1-120 (Sep. 2007).
Notification of Transmittal of the International Search Report and the Written Opinion of the International Searching Authority, or the Declaration for International Application No. PCT/US06/41449 (Jun. 20, 2007).
Notice of Allowance and Fee(s) Due for U.S. Appl. No. 11/070,940 (May 11, 2007).
Final Official Action for U.S. Appl. No. 11/070,940 (Mar. 9, 2007).
Notification of European publication number and information on the application of Article 67(3) EPC for European Application No. 05724466.7 (Nov. 22, 2006).
Notification of Transmittal of the International Search Report and the Written Opinion of the International Searching Authority, or the Declaration in International Application No. PCT/US05/06926 (Oct. 11, 2006).
Non-Final Official Action for U.S. Appl. No. 11/070,940 (Jun. 20, 2006).
"Prepaid vs. Number Portability," Power Point presentation (publication date unknown; electronic file creation date Jul. 29, 2003.).
"Description of the SMS Prepaid Relay Function Implemented in the SRF Equipment," edition 0.1, unpublished, dated Jul. 2001.
Non-Final Office Action for U.S. Appl. No. 13/366,928 (Mar. 26, 2013).
Supplemental Notice of Allowability for U.S. Appl. No. 13/026,031 (Mar. 22, 2013).
Communication of European publication number and information on the application of Article 67(3) EPC for European Patent Application No. 11792956.2 (Mar. 13, 2013).
Notice of Allowance and Fee(s) Due for U.S. Appl. No. 13/026,098 (Mar. 11, 2013).
Interview Summary for U.S. Appl. No. 13/026,144 (Mar. 4, 2013).
Supplemental Notice of Allowability for U.S. Appl. No. 13/026,162 (Feb. 27, 2013).
Notice of Allowance and Fee(s) Due for U.S. Appl. No. 13/025,968 (Feb. 27, 2013).
Non-Final Office Action for U.S. Appl. No. 13/409,949 (Feb. 15, 2013).
Supplemental Notice of Allowability for U.S. Appl. No. 13/026,162 (Feb. 7, 2013).
Notice of Allowance and Fee(s) Due for U.S. Appl. No. 13/026,031 (Jan. 30, 2013).
Supplemental Notice of Allowability for U.S. Appl. No. 13/026,162 (Jan. 24, 2013).
Notice of Allowance and Fee(s) Due for U.S. Appl. No. 13/366,928 (Jan. 7, 2013).
Non-Final Office Action for U.S. Appl. No. 13/192,410 (Dec. 20, 2012).
Notice of Allowance and Fee(s) Due for U.S. Appl. No. 13/026,162 (Dec. 19, 2012).
Non-Final Office Action for U.S. Appl. No. 13/409,893 (Dec. 13, 2012).
Commonly-assigned, co-pending U.S. Appl. No. 13/712,481 for "Method, Systems, and Computer Readable Media for Encrypting Diameter Identification Information in a Communication Network," (unpublished, filed Dec. 12, 2012).
Final Official Action for U.S. Appl. No. 13/026,076 (Dec. 7, 2012).
Final Official Action for U.S. Appl. No. 13/026,105 (Nov. 26, 2012).
Communication of European Publication Number and Information on the Application of Article 67(3) EPC for European Patent Application No. 11742923.3 (Nov. 21, 2012).
Communication of European Publication Number and Information on the Application of Article 67(3) EPC for European Patent Application No. 11742912.6 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742905.0 (Nov. 21, 2012).
Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).
Non-Final Official Action for U.S. Appl. No. 13/026,153 (Nov. 6, 2012).
Non-Final Official Action for U.S. Appl. No. 12/409,914 (Nov. 6, 2012).
Notification of Transmittal of the International Search Report and the Written Opinion of the International Searching Authority, or the Declaration for International Patent Application No. PCT/US2012/036784 (Nov. 1, 2012).
Communication of European publication Number and information on the application of Article 67(3) EPC for European Patent Application No. 10841605.8 (Oct. 17, 2012).
Non-Final Official Action for U.S. Appl. No. 13/026,144 (Oct. 16, 2012).
Non-Final Official Action for U.S. Appl. No. 13/026,098 (Sep. 20, 2012).
Non-Final Official Action for U.S. Appl. No. 13/026,060 (Sep. 19, 2012).
Communication of European publication Number and information on the application of Article 67(3) EPC for European Patent Application No. 11742921.7 (Sep. 12, 2012).
Non-Final Official Action for U.S. Appl. No. 13/026,081 (Sep. 12, 2012).
Non-Final Official Action for U.S. Appl. No. 13/161,443 (Sep. 12, 2012).
Non-Final Official Action for U.S. Appl. No. 13/026,112 (Aug. 29, 2012).
Communication of European publication number and information on the application of Article 67(3) EPC for European Application No. 10824243.9 (Jul. 25, 2012).
Non-Final Official Action for U.S. Appl. No. 13/026,076 (Jun. 4, 2012).
Non-Final Official Action for U.S. Appl. No. 13/026,105 (May 16, 2012).
Decision to grant a European patent pursuant to Article 97(1) EPC for European Application No. 05854512.0 (Mar. 15, 2012).
Notification of Transmittal of the International Search Report and the Written Opinion of the International Searching Authority, or the Declaration for International Patent Application No. PCT/US2011/040525 (Dec. 16, 2011).
Communication under Rule 71(3) EPC for European application No. 05854512.0 (Nov. 11, 2011).
Notification of Transmittal of the International Search Report and the Written Opinion of the International Searching Authority, or the Declaration for International Application No. PCT/US2011/024622 (Oct. 31, 2011).

Notification of Transmittal of the International Search Report and the Written Opinion of the International Searching Authority, or the Declaration for International Application No. PCT/US2011/024617 (Oct. 31, 2011).
Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024646 (Oct. 28, 2011).
Notification of Transmittal of the International Search Report and the Written Opinion of the International Searching Authority, or the Declaration for International Application No. PCT/US2011/024645 (Oct. 28, 2011).
Notification of Transmittal of the International Search Report and the Written Opinion of the International Searching Authority, or the Declaration for International Application No. PCT/US2011/024642 (Oct. 28, 2011).
Notification of Transmittal of the International Search Report and the Written Opinion of the International Searching Authority, or the Declaration for International Application No. PCT/US2011/024621 (Oct. 28, 2011).
Notification of Transmittal of the International Search Report and the Written Opinion of the International Searching Authority, or the Declaration for International Application No. PCT/US2011/024637 (Oct. 27, 2011).
Notification of Transmittal of the International Search Report and the Written Opinion of the International Searching Authority, or the Declaration for International Application No. PCT/US2011/024629 (Oct. 27, 2011).
Notification of Transmittal of the International Search Report and the Written Opinion of the International Searching Authority, or the Declaration for International Application No. PCT/US2011/024625 (Oct. 25, 2011).
Notification of Transmittal of the International Search Report and the Written Opinion of the International Searching Authority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Notice of Allowance and Fee(s) Due for U.S. Appl. No. 11/303,757 (May 11, 2011).
Traffix Systems, "Datasheet; Traffix Signaling Delivery Controller (SDC)," pp. 1-5 (May 2011).
"Ericsson Unified Number Portability," (Downloaded from the Internet on Jan. 24, 2011).
U.S. Appl. No. 11/303,757 (Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).
Communication pursuant to Article 94(3) EPC for European Application No. 05 854 512.0 (Oct. 12, 2010).
"Digital cellular telecommunications system (Phase 2+); Universal Mobile telecommunications system (UMTS) LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile telecommunications system (UMTS) LTE; End-to end Quality of Service (QoS) concept and architecture (3GPP TS 23.207 version 9.0.0 Release 9)," ETSI TS 123 207, V9.0.0 (Oct. 2010).
"3rd Generation Partnership Project; Technical Specification Group Service and System Aspects; Telecommunication management; Charging management; Packet Switched (PS) domain charging (Release 9)," 3GPP TS 32.251, V9.4.0 (Oct. 2010).

Znaty, "Diameter, GPRS, (LTE + ePC= EPS), IMS, PCC and SDM," EFORT (May 2010). (Part 1 of 2, pp. 1-229).
Znaty, "Diameter, GPRS, (LTE + ePC= EPS), IMS, PCC and SDM," EFORT (May 2010). (Part 2 of 2, pp. 230-460).
Communication pursuant to Article 94(3) EPC for European Application No. 05854512.0 (Feb. 8, 2010).
"Traffix Diameter Gateway; Instant Diameter Connection to any Network Element," Traffix System, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unkown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unkown) (Downloaded from the Internet on Feb. 8, 2010).
"Universal Mobile Telecommunications Systems (UMTS); LTE; InterWorking Function (IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications Systems (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
"Mapping Diameter Interfaces to Functionality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ieff-dime-extended-naptr-00, pp. 1-9 (Dec. 29, 2009).
Final Official Action for U.S. Appl. No. 11/303,757 (Dec. 9, 2009).
Korhonen et al., "Clarifications on the Routing of Diameter Requests Based on the Username and the Realm," RFC 5729, pp. 1-9 (Dec. 2009).
"3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).
3GPP, "3rd Generation Partnership Project; Technical Specification Group Services and System Aspects; Telecommunication Management; Charging Management; Diameter Charging Applications (Release 9)," 3GPP TS 32.299 V9.2.0 (Dec. 2009).
3GPP, "3rd Generation Partnership Project; Technical Specification Group Services and System Aspects; Telecommunication Management; Charging Management; Online Charging System (OCS): Applications and Interfaces (Release 9)," 3GPP TS 32.296 V9.1.0 (Dec. 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Base on the Diameter Protocol; Protocol Details (Release 9)," 3GPP TS 29.329 V9.0.0 (Dec. 2009).
3GPP, "3rd Generation Partnership Project; Technical Specification Group Core Network and Terminals; IP Multimedia (IM) Subsystem Sh Interface; Signalling Flows and Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).
3GPP, "3rd Generation Partnership Project; Technical Specification Group Core Network and Terminals; Cx and Dx Interface Based on the Diameter Protocol; Protocol Detail (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interface; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control Over Gx Reference Point (Release 9)," 3GPP TS 29.212 V9.1.0 (Dec. 2009).
3GPP, "3rd Generation Partnership Project; Technical Specification Group Service and System Aspects; Policy and Charging Control Over Architecture (Release 9)," 3GPP TS 23.203 V9.3.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Supplementary European Search Report for European Application No. 05854512.0 (Nov. 17, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Dinameter Maintenamce and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
3GPP, "3rd Generation Partnership Project; Technical Specification Group Core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).
3GPP, "3rd Generation Partnership Project; Technical Specification Group Core Network and Terminals; Numbering, Addressing and Identification (Release 8)," 3GPP TS 23.003 V8.6.0 (Sep. 2009).
Jones et al., "Diameter Extended NAPTR," Internet-Draft, draft-jones-dime-extended-naptr-00, pp. 1-8 (Aug. 23, 2009).
Korhonen et al., "Diameter User-Name and Realm Based Request Routing Clarifications," Internet-Draft, draft-ietf-dime-nai-routing-03.txt, pp. 1-11 (Aug. 19, 2009).
Tsou et al., "Session-Specific Explicit Diameter Request Routing," Network Working Group Internet-Draft, draft-tsou-diameter-explicit-routing-03, pp. 1-18 (Aug. 5, 2009).
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).
Official Action for U.S. Appl. No. 11/303,757 (May 28, 2009).
Bhardwaj, "Roaming Hubbing & LTE," GSMA London, pp. 1-11 (May 19, 2009).
3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).
Final Official Action for U.S. Appl. No. 11/303,757 (Oct. 6, 2008).
Official Action for U.S. Appl. No. 11/303,757 (May 7, 2008).
Notification of Transmittal of the International Search Report and the Written Opinion corresponding to International Application No. PCT/US05/45813 (Mar. 24, 2008).
Official Action for U.S. Appl. No. 11/303,757 (Feb. 21, 2008).
Restriction Requirment for U.S. Appl. No. 11/303,757 (Oct. 4, 2007).
"Tekelec Announces TekCore IMS Core Platform," (Jun. 5, 2006).
3GPP, "3rd Generation Partnership Project; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).
"Operator Guidebook to IMS and New Generation Networks and Services," www.morianagroup.com, Second Edition (Feb. 2006).

Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).

Aboba et al., "The Network Access Identifier," Network Working Group, RFC 4282, pp. 1-17 (Dec. 2005).

3GPP, "3rd Generation Partnership Project; Technical Specification Group Core Network and Terminals; Policy Control Over Go Interface (Release 6)," 3GPP TS 29.207 V6.5.0 (Sep. 2005).

Eronen et al., "Diameter Extensible Authentication Protocol (EAP) Application," Network Working Group, RFC 4072, pp. 1-31 (Aug. 2005).

Hakala et al., "Diameter Credit-Control Application," Network Working Group RFC 4006, pp. 1-107 (Aug. 2005).

Calhoun et al., "Diameter Network Access Server Application," RFC 4005, pp. 1-85 (Aug. 2005).

Calhoun et al., "Diameter Mobile IPv4 Application," Network Working Group, RFC 4004, pp. 1-50 (Aug. 2005).

"Operator Guidebook to IMS and New Generation Networks and Services," www.morianagroup.com, First Edition, pp. 1-450 (Aug. 2005) (Part 1 of 2).

"Operator Guidebook to IMS and New Generation Networks and Services," www.morianagroup.com, First Edition, pp. 451-934 (Aug. 2005) (Part 2 of 2).

Gonzalo et al., "The 3G IP Multimedia Subsystem," Chapter 3: General Principles of the IMS Architecture (Aug. 20, 2004).

"IP Multimedia Subsystem IMS Over and Applications," 3G Americas, pp. 1-17 (Jul. 2004).

"3rd Generation Partnership Project; Technical Specification Group Core Network and Terminals; IP Multimedia (IM) Session Handling; IM Call Model; Stage 2 (Release 6)," 3GPP TS 23.218, V6.1.0, pp. 1-56 (Mar. 2004).

"IMS Security Framework," 3GPP2 S.R0086-0, Version 1.0, pp. 1-39 (Dec. 11, 2003).

"IP Multimedia Subsystem—Accounting Information Flows and Protocol," 3GPP2 X.S0013-008-0, Version 1.0, pp. 1-42 (Dec. 2003).

"IP Multimedia Subsystem—Charging Architecture," 3GPP2 X.S0013-007-0, Version 1.0, pp. 1-16 (Dec. 2003).

"All-IP Core Network Multimedia Domain," 3rd Generation Partnerships Project 2 (3GPP2), 3GPP2 X.S0013-000-0, Version 1.0, pp. i-ii and 1-14 (Dec. 2003).

"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).

Loughney., "Diameter Command Codes for Third Generation Partnership Project (3GPP) Release 5," Network Working Group, RFC 3589 (Sep. 2003).

Calhoun et al., "Diameter Base Protocol," Network Working Group, RFC 3588, pp. 1-148 (Sep. 2003).

Aboba et al., "Authentication, Authorization and Accounting (AAA) Transport Profile," Network Working Group, RFC 3539, pp. 1-39 (Jun. 2003).

"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).

Olson et al., "Support for IPv6 in Session Description Protocol (SDP)," RFC 3266, pp. 1-5 (Jun. 2002).

Rosenberg et al., "SIP: Session Initiation Protocol," RFC 3261, pp. 1-252 (Jun. 2002).

Howard, "Sipping IETF51 3GPP Security and Authentication," http://www3.ietf.org/proceedings/01aug/slides/sipping-7/index.htm (Dowloaded from Internet on Dec. 16, 2005) (Sep. 13, 2001).

Calhoun et al., "Diameter Base Protocol," draft-ietf-aaa-diameter-07, Section 6.3, p. 68 (Jul. 2001).

Narten et al., "Privacy Extensions for Stateless Address Autoconfiguration in IPv6," RFC 3041, pp. 1-16 (Jan. 2001).

Stewart et al., "Stream Control Transmission Protocol," Network Working Group RFC 2960, pp. 1-134 (Oct. 2000).

Faltstrom, "E.164 Number and DNS," RFC 2916, pp. 1-10 (Sep. 2000).

Vaha-Sipila, "URLs for Telephone Calls," RFC 2806, pp. 1-20 (Apr. 2000).

Aboba et al., "The Network Access Identifier," RFC 2486, pp. 1-8 (Jan. 1999).

Calhoun et al., "Diameter Proxy Server Extensions," IETF Working Draft, draft-calhoun-diameter-proxy-01.txt (Aug. 1, 1998).

Berners-Lee et al., "Uniform Resource Identifiers (URI): Generic Syntax," RFC 2396, pp. 1-38 (Aug. 1998).

Greene et al., "Bi-Directional Session Setup Extension to Diameter," Internet Draft <draft-greene-diameter-ss7-session-00.txf>, pbs. 1-12 (Jul. 1998).

Tekelec, "Eagle® Feature Guide," P/N 910-1225-01 (Jan. 1998).

Jalava, "Service Routing in 3GPP IP Multimedia Subsystem," Nokia, pp. 1-16 (Publication Date Unknown).

Final Office Action for U.S. Appl. No. 13/026,060 (May 10, 2013).

Notice of Allowance and Fee(s) Due for U.S. Appl. No. 13/026,144 (May 1, 2013).

Non-Final Office Action for U.S. Appl. No. 13/154,119 (May 2, 2013).

Notice of Allowance and Fee(s) Due for U.S. Appl. No. 13/026,112 (Apr. 26, 2013).

Notice of Allowance and Fee(s) Due for U.S. Appl. No. 13/026,153 (Apr. 15, 2013).

Notice of Allowance and Fee(s) Due for U.S. Appl. No. 13/026,162 (Apr. 1, 2013).

Communication of European Publication Number and Information on the Application of Article 67(3) EPC for European Patent Application No. 11796367.8 (Mar. 27, 2013).

Rouse, "Platform," http://searchservervirtualization.techtarget.com/definition/platform, pp. 1-2 (2006-2009).

* cited by examiner

| DIAMETER SESSION-ID 502 | USER NAME 504 | IMSI 506 | IMPI 508 | IMPU 510 | SIP URI 512 | NAI 514 | MOBILE/ DIALABLE NUMBER 516 | USER IP ADDRESS 518 | SERVICE NODE IDENTIFIER/ ADDRESS 520 |
|---|---|---|---|---|---|---|---|---|---|
| 123 | x | y | | | | | | z | CDF_1 |
| 345 | | | xx | | ttt | | | zz | PCRF_1 |
| 678 | xxx | | | | | | | zzz | CDF_1 |

FIG. 5

METHODS, SYSTEMS, AND COMPUTER READABLE MEDIA FOR ENRICHING A DIAMETER SIGNALING MESSAGE

PRIORITY CLAIM

This application claims the benefit of U.S. Provisional Patent Application Ser. No. 61/448,953 filed Mar. 3, 2011; the disclosure of which is incorporated herein by reference in its entirety.

TECHNICAL FIELD

The subject matter described herein relates to modifying Diameter signal messages with information associated mobile subscribers. More specifically, the subject matter relates to methods, systems, and computer readable media for enriching a Diameter signaling message.

BACKGROUND

At present, problems exist with the assignment of Diameter-based network service nodes to Diameter signaling messages associated with a common mobile subscriber. Namely, there are hindrances associated with the communication between the Diameter-based network service nodes. For instance, a network service node may require additional information (e.g., a network address) of another network service node that is servicing a Diameter based message associated with the common mobile subscriber. In such a scenario, the network service node is compelled to create and transmit query messages to database nodes that store the additional network service node information. These query messages generate unnecessary traffic and consume network resources. Thus, the pre-emptive provisioning of additional network service node information in a manner that does not generate unnecessary network traffic is desirable by network operators.

Accordingly, a need exists for improved methods, systems, and computer readable media for enriching a Diameter signaling message.

SUMMARY

Methods, systems, and computer readable media for enriching a Diameter signaling message are disclosed. In one exemplary embodiment, the method comprises receiving, at a Diameter routing node, a Diameter signaling message that is associated with a mobile subscriber and includes mobile subscriber related information and querying a Diameter binding repository (DBR) using the mobile subscriber related information to select a network service node from a plurality of network service nodes configured to process the Diameter signaling message. The method further includes obtaining DBR information associated with the mobile subscriber from the DBR, wherein the DBR information includes an identifier associated with the selected network service node and modifying the Diameter signaling message to include at least a portion of the DBR information. As used herein, the term "node" refers to a physical computing platform including one or more hardware processors and associated memory.

The subject matter described herein may be implemented in software in combination with hardware and/or firmware. For example, the subject matter described herein may be implemented in software executed by a processor. In one exemplary implementation, the subject matter described herein for enriching a Diameter signaling message may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which:

FIG. 5 is an exemplary table depicting binding record data used to designate a network service node according to an embodiment of the subject matter described herein.

DETAILED DESCRIPTION

The subject matter described herein includes methods, systems, and computer readable media for enriching a Diameter signaling message. As used herein, the term Diameter refers to the authentication, authorization, and accounting (AAA) protocol utilized by telecommunications and computer networks as defined by RFC 3588. In one embodiment, the present subject matter includes a Diameter signaling routing (DSR) node that receives a Diameter signaling message associated with a particular mobile subscriber. The received Diameter signaling message may also require processing from a particular type of network service node, such as a network charging function node (e.g., a charging data function (CDF), a policy and charging rules function (PCRF), etc.). Upon receiving the Diameter signaling message, the DSR node may be configured to query a Diameter binding repository (DBR) to determine a preferred network service node to process the received Diameter signaling message. In one embodiment, the query message triggers the DBR to check stored binding records to determine whether a preferred network service node is already assigned (or "bound") to the mobile subscriber. As used herein, a binding record may include an electronic record that includes one or more associations formed between assigned network service nodes and mobile subscriber information (e.g., identifiers). Accordingly, the DBR may obtain and provide DBR information stored in the binding records to the DSR. The DSR may subsequently modify Diameter signaling messages directed toward the preferred network service node to include at least a portion of the received DBR information. Therefore, preferred network service nodes may be provided with an enriched Diameter signaling message that contains additional mobile subscriber information, additional session identifiers associated with a mobile subscriber, and identification/identity/address information associated with other network service nodes supporting the mobile subscriber. In one embodiment, the present subject matter may be implemented in a Long Term Evolution (LTE) network and/or Internet protocol Multimedia Subsystem (IMS) network. Alternatively, the present subject matter may be deployed in other network implementations without departing from the scope of the present subject matter.

Figure 1:
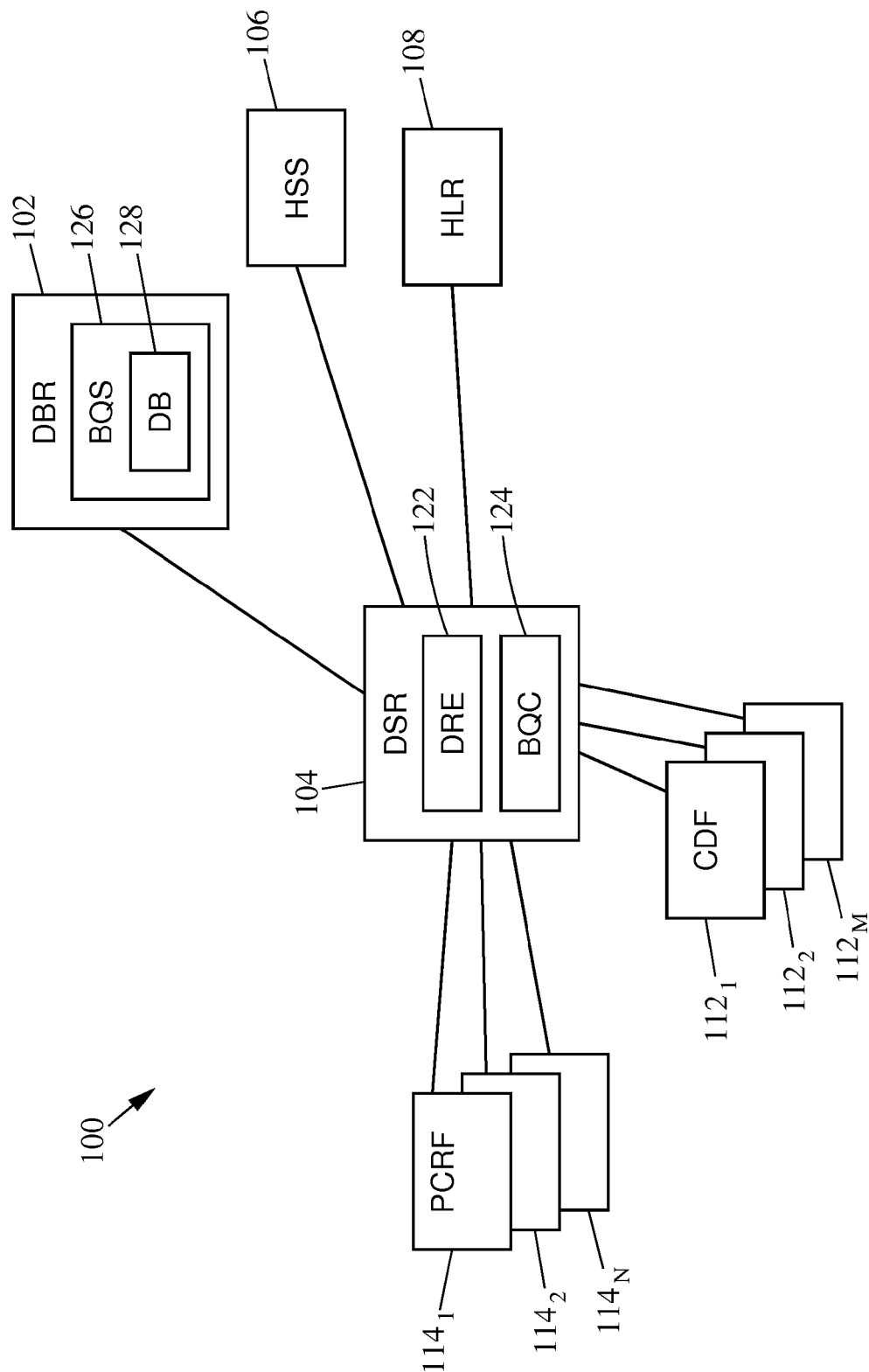
FIG. 1 is a block diagram illustrating a system for enriching a Diameter signaling message according to an embodiment of the subject matter described herein.

FIG. 1 depicts an exemplary system 100 that includes a number of various network elements that may be utilized to enrich a Diameter signaling message. In one embodiment, system 100 includes a Diameter routing node, e.g., a DSR 104, configured to receive a Diameter signaling message that is associated with a mobile subscriber. Although FIG. 1 illustrates the use of a DSR, any network node that is configured to route Diameter signaling messages may be utilized without departing from the scope of the subject matter. For example, the network node may also include a Diameter routing agent (DRA), a Diameter proxy agent (DPA), a Diameter relay agent, a Diameter translation agent, a Diameter redirect agent, and the like. In one embodiment, DSR 104 includes a Diameter routing engine (DRE) 122 that may be configured to route Diameter signaling messages between various Diameter nodes on various Diameter interfaces including, but not limited to, the Gy, Ro, Rf, and S6a interfaces. Exemplary Diameter-based signaling messages received by DSR 104 include credit control request (CCR) messages, accounting request (ACR) messages, update location request (ULR) messages, Diameter mobility management messages, and Diameter charging messages. In one embodiment, Diameter signaling messages received by the Diameter routing node may be sent by a network node (not shown) such as, for example, a policy and charging enforcement function (PCEF) node, a gateway GPRS support node (GGSN), a mobility management entity (MME), and a public data network (PDN) gateway. DSR 104 may also include a binding query client (BQC) 124 that is configured to communicate (e.g., send query/request messages and receive answer/response messages) with one or more DBRs (e.g., DBR 102).

In one embodiment, the Diameter signaling message received by DSR 104 may originally be destined or addressed to a network service node that is capable of processing the Diameter signaling message. Although FIG. 1 depicts an exemplary plurality of network service nodes to which the Diameter signaling message may be routed, such as CDFs $112_{1 \ldots m}$ and PCRFs $114_{1 \ldots n}$, any other type of network service node(s) configured for servicing a Diameter signaling message may be utilized in system 100 without departing from the scope of the present subject matter. For example, the network service node may include a policy and charging rules function (PCRF) node, a network charging node (e.g., a charging data function (CDF), a charging trigger function (CTF), a charging gateway function (CGF)), an online charging system (OCS) node, an offline charging system (OFCS) node, a home subscriber server (HSS) node, a home location register node (HLR), an AAA node, and a call session control function (CSCF) node.

In FIG. 1, system 100 further includes a Diameter binding repository (DBR) 102 that comprises a binding query server (BQS) 126 that hosts a binding record database 128. In one embodiment, binding record database 128 may be configured to store binding records that comprise associations (e.g., Diameter-related bindings, mappings, links, etc.) between mobile subscriber identifiers and assigned network service nodes. Exemplary Diameter-related bindings stored by DBR 102 may include, but are not limited to, Diameter session bindings, Diameter session-identifier-to-network service node associations, Diameter end-to-end identifier-to-network service node associations, mobile subscriber identifier-to-network service node associations, charging identifier-to-network service node associations, and the like. In one embodiment, a charging identifier may include an IMS charging ID. An exemplary binding record database 128 is described in FIG. 5 below.

In the embodiments illustrated herein, DBR 102 is shown as being a stand-alone entity, such as a network node, a computer, a server, an application, or a database that is located separate from a DSR 104. However, DBR 102 may be co-located within a DSR or co-located within any other network node in other embodiments (not shown). Although only a single DSR and a single DBR are shown in FIG. 1, the present subject matter may include additional DSRs and DBRs that are communicatively connected to DSR 104 and DBR 102 without departing from the scope of the present subject matter.

Figure 2:
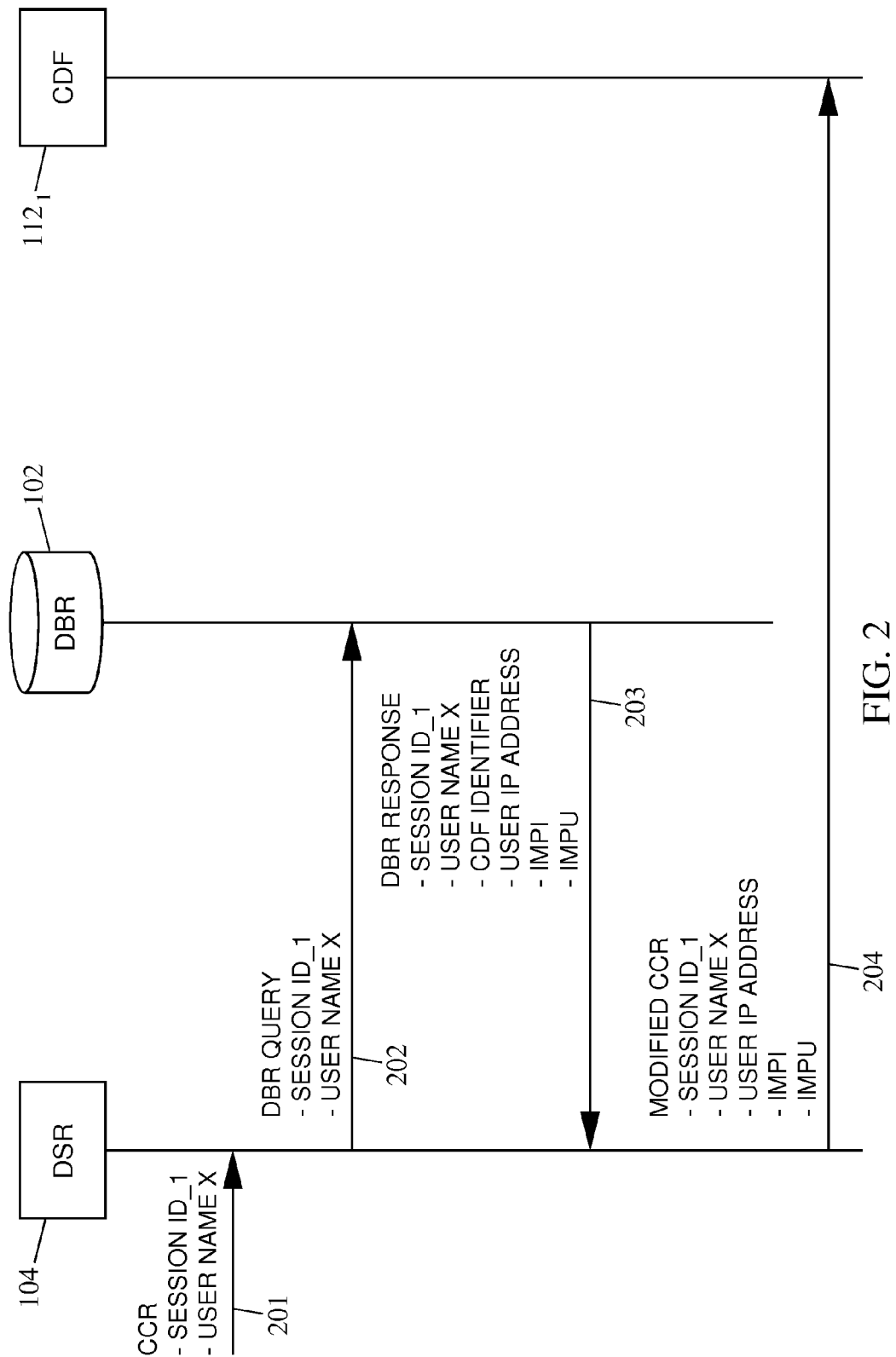
FIG. 2 is a message sequence diagram illustrating the enriching of a Diameter signaling message according to an embodiment of the subject matter described herein.

FIG. 2 illustrates an exemplary Diameter based message sequence diagram that depicts the enriching of a Diameter signaling message according to an embodiment of the subject matter described herein. As shown in FIG. 2, DSR 104 receives a Diameter signaling message, i.e., credit control request (CCR) message 201, which includes mobile subscriber related information. In this example, the mobile subscriber related information includes a user name (e.g., "User Name X") and a session identifier (e.g., "Session ID_1"). In one embodiment, the session identifier serves as an identifier for a communications session to be established between the network node sending the CCR message (e.g., a PCEF) and the network service node that is ultimately selected to process the CCR message.

In one embodiment, DSR 104 may be configured to extract the mobile subscriber related information from the received Diameter signaling message. Examples of mobile subscriber related information extracted from a Diameter signaling message include, but not limited to, Diameter session identifier information, user-name information, international mobile subscriber identity (IMSI) information, IMS private identity (IMPI) information, IMS public identity (IMPU) information, session initiation protocol (SIP) uniform resource identifier (URI) information, network access identifier (NAI) information, mobile/dialable number information, mobile subscriber directory number information, IMS charging identifier information, mobile station international subscriber directory number (MSISDN) information, and user Internet protocol (IP) address information. Returning to FIG. 2, CCR message 201 includes a user name and a session identifier that is extracted by DSR 104.

In one embodiment, DSR 104 may also be configured to insert the extracted mobile subscriber related information into a DBR query message. For example, DSR 104 may generate a DBR query message 202 that is used to request the identity and/or address of a network service node capable of processing CCR message 201. In one embodiment, DSR 104 is configured to insert the user name and session identifier information extracted from message 201 into query message 202.

As depicted in FIG. 2, DBR 102 may receive, from DSR 104, DBR query message 202 which contains the extracted mobile subscriber related information, e.g., the session identifier and user name identifier associated with the mobile subscriber. In one embodiment, DBR 102 may be configured to cross-reference the received user name identifier with a listing of mobile subscriber identifiers stored in binding records contained in record database 128, which contains a plurality of binding records. If the cross-referencing process results in locating an entry that matches the extracted user name identifier, DBR 102 may obtain the DBR information contained in the binding record that is associated with the matching entry. In one embodiment, a binding record contains a user IP address, an IMPI, an IMPU, a user name identifier, and an associated network service node identifier/identity/address. If the extracted user name identifier matches the user name identifier in this particular binding record, then DBR 102 may obtain the network service node identifier (e.g., an identifier identifying CDF 112₁) that is bound to the user name identifier. DBR 102 may also obtain the plurality of other identifiers stored in the same binding record and that are associated with the mobile subscriber (i.e., the matching user name). For example, DBR 102 may obtain the user IP address, IMPI, and IMPU from the binding record.

After obtaining the DBR information from record database 128, DBR 102 may then generate a DBR response message 203 that includes the DBR information and subsequently routes response message 203 to DSR 104. As indicated in FIG. 2, the DBR information may include parameters/identifiers such as a network service node identity/address (e.g., identifier for CDF 112₁), a user-name identifier, a user IP address, an IMPI, and an IMPU associated with the mobile subscriber.

FIG. 2 further depicts DSR 104 receiving DBR response message 203 which contains the DBR information from DBR 102. DSR 104 may then use the received DBR information along with the network service node identifier information (e.g., CDF 112₁) to modify/enrich the originally received Diameter based CCR message 201. Specifically, DSR 104 inserts at least a portion (e.g., some or all) of the DBR information into the original CCR message 201 such that a modified CCR message 204 is generated. As indicated in FIG. 1, CCR message 201 is modified such that a user IP address, an IMPI, and an IMPU are added to the original session identifier and user name contained in message 201, which results in a modified CCR message 204. DSR 104 may also be configured to use the obtained network service node identifier (i.e., CDF identifier contained in message 203) to address and route message 204 to CDF 112₁. In an alternate embodiment, DSR 104 may be configured to generate a completely new CCR message, which includes some or all of the DBR information, instead of modifying the originally received CCR message 201.

Figure 3:
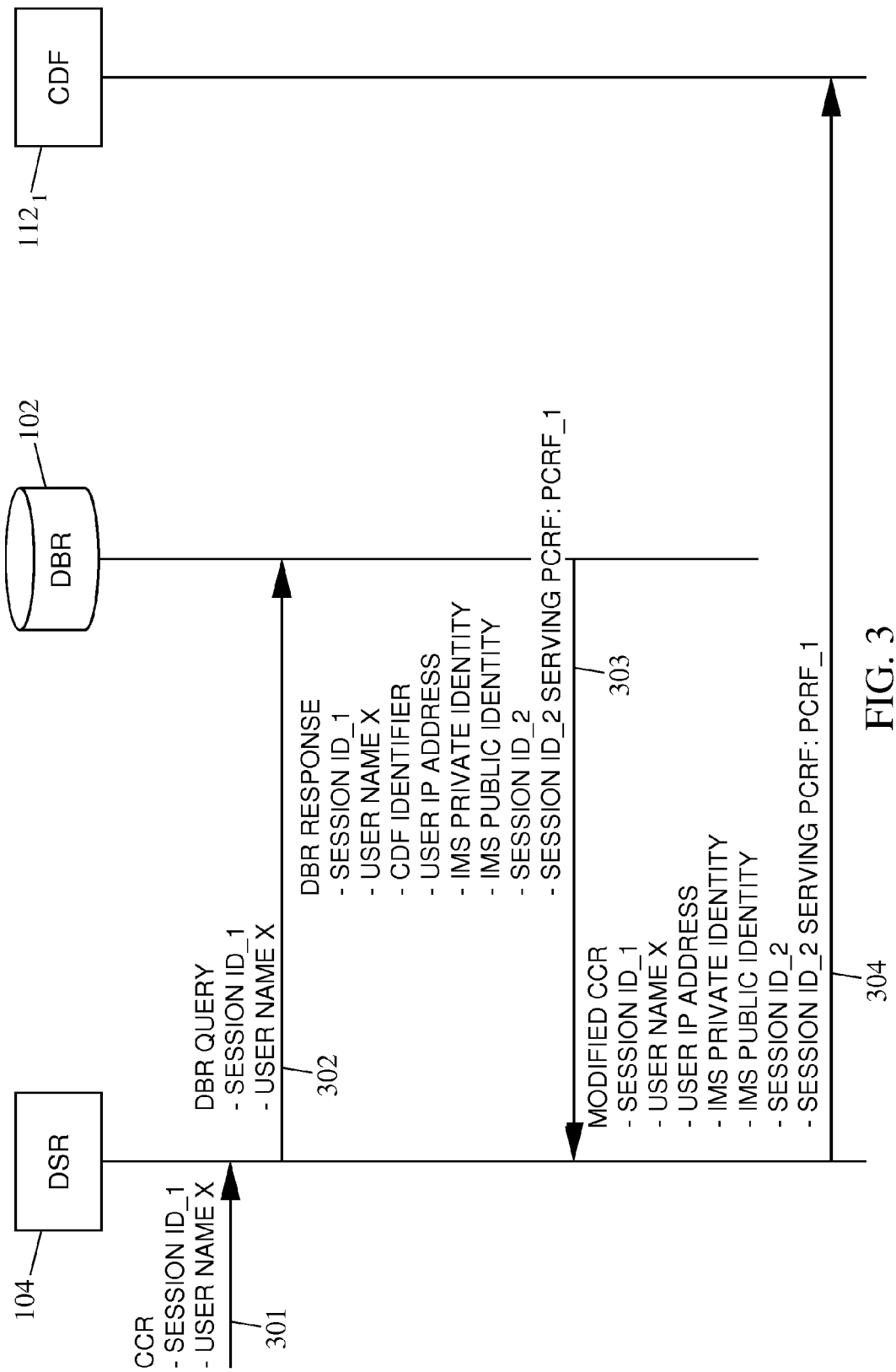
FIG. 3 is a message sequence diagram illustrating the enriching of a Diameter signaling message with additional mobile subscriber related session information according to an embodiment of the subject matter described herein.

FIG. 3 illustrates an exemplary Diameter based message sequence diagram that depicts the enriching of a Diameter signaling message with additional mobile subscriber related session information according to an embodiment of the subject matter described herein. As shown in FIG. 3, DSR 104 receives a Diameter signaling message, i.e., credit control request (CCR) message 301, which includes mobile subscriber related information. In this example, the mobile subscriber related information includes a user name (e.g., "User Name X") and a session identifier (e.g., "Session ID_1"). In one embodiment, the session identifier serves as an identifier for a communications session to be established between the node sending the CCR message and the network service node that is ultimately selected to service the CCR message. In one embodiment, DSR 104 may be configured to extract the mobile subscriber related information from the received CCR message 301, such as the user name identifier/identity and a session identifier.

In one embodiment, DSR 104 may also be configured to insert the extracted mobile subscriber related information into a DBR query message. For example, DSR 104 may generate a DBR query message 302 that is used to request the identity, identifier, and/or address of a network service node capable of processing CCR message 301. In one embodiment, DSR 104 is configured to insert the user name and session identifier information extracted from message 301 into query message 302.

As depicted in FIG. 3, DBR 102 may receive, from DSR 104, DBR query message 302 which contains the extracted mobile subscriber related information, e.g., the session identifier and user name identifier associated with the mobile subscriber. In one embodiment, DBR 102 may be configured to cross-reference the received user name identifier with a listing of mobile subscriber identifiers stored in binding records contained in record database 128 (depicted in FIG. 1). If the cross-referencing process results in locating an entry that matches the extracted user name identifier, DBR 102 may obtain the DBR information contained in the associated binding record that corresponds with the matching entry. For example, DBR 102 may obtain the network service node identifier (e.g., CDF identifier 112₁), identity, or address that is bound to the matching user name identifier in the binding record. DBR 102 may also obtain a plurality of the other identifiers/parameters stored in the same binding record and that are associated with the mobile subscriber. For example, the binding record may indicate that a user IP address, an IMPI, and an IMPU are associated with the user name identifier.

In addition, DBR 102 may also obtain a second session identifier that identifies an established communications session between a second network service node (e.g., "PCRF_1") and another Diameter network node seeking to obtain information regarding the mobile subscriber. For example, DBR 102 may obtain the session identifier "Session ID_2" and the network service node identifier "serving PCRF_1" from the same aforementioned binding record in database 128. In this example, "PCRF_1" has been previously designated to provide service or process information for a querying Diameter node that requested information regarding the mobile subscriber associated with "User Name X".

After obtaining the DBR information from database 128, DBR 102 may then generate a DBR response message 303 that includes the DBR information and subsequently route response message 303 to DSR 104. As indicated in FIG. 3, the DSR information may include parameters/identifiers such as a first network service node identity/address (e.g., identifier for CDF 112₁), a user-name identifier, a user IP address, an IMPI, and an IMPU associated with the mobile subscriber. Notably, message 303 may also include the second session identifier and the second network service node identifier/identity.

FIG. 3 further depicts DSR 104 receiving DBR response message 303 which contains the DBR information from DBR 102. DSR 104 may then use the received DBR information along with the network service node identifier information (e.g., an identifier associated with CDF 112₁) to modify the originally received Diameter based CCR message 301. Specifically, DSR 104 may insert at least a portion (e.g., some or all) of the DBR information into the original CCR message 301 such that a modified CCR message 304 is generated. As indicated in FIG. 1, CCR message 301 is modified such that a user IP address, an IMPI, and an IMPU is added to the original session identifier and user name contained in message 301, which results in a modified CCR message 304. DSR 104 may also be configured to use the obtained network service node identifier (i.e., CDF identifier contained in message 303) to address and route message 204 to CDF 112₁. The DBR information may also include the second session identifier (e.g., "Session ID_2") and second network service node identifier/identity (e.g., "PCRF_1"). By providing the second network service node and session information to the first network service node, i.e. CDF 112₁, the present subject matter is preemptively providing known network service node information to CDF 112₁ so that CDF 112₁ does not need to query a third party node or database if CDF 112₁ needs to communicate with or otherwise know the identity of other network service nodes processing other Diameter signalling messages associated with the mobile subscriber. In an alternate embodiment, DSR 104 may generate a completely new CCR message, which includes some or all of the DBR information, instead of modifying the originally received CCR message 301.

Figure 4:
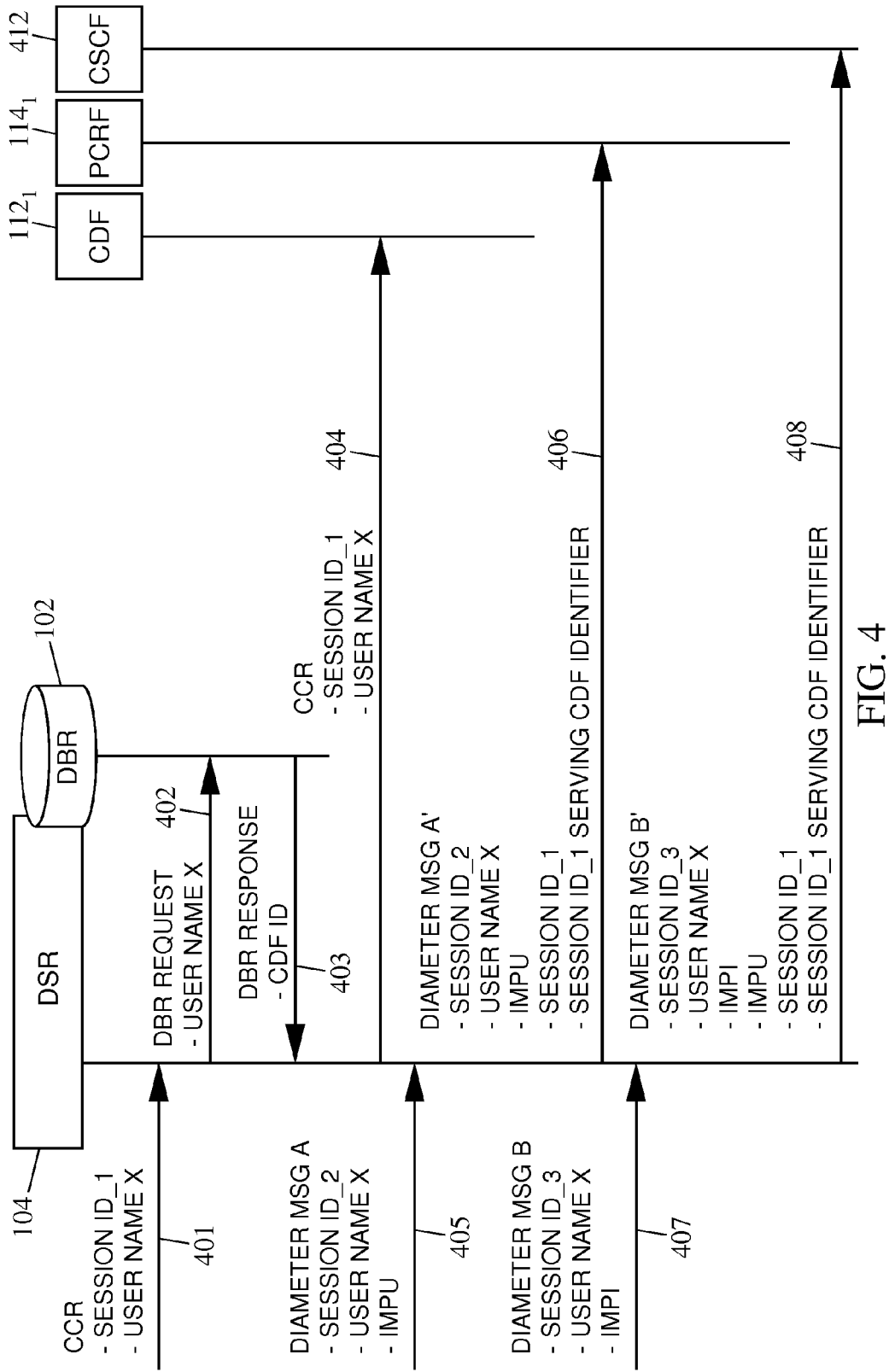
FIG. 4 is a message sequence diagram illustrating the enriching of a plurality of Diameter signaling messages according to an embodiment of the subject matter described herein.

FIG. 4 illustrates an exemplary Diameter based message sequence diagram that depicts the enriching of a plurality of Diameter signaling messages according to an embodiment of the subject matter described herein. As shown in FIG. 4, DSR 104 receives a Diameter signaling message, i.e., credit control request (CCR) message 401, which includes mobile subscriber related information. In this example, the mobile subscriber related information includes a user name (e.g., "user name X") and a session identifier (e.g., "Session ID_1"). In one embodiment, the session identifier serves as an identifier for a communications session to be established between the node sending the CCR message and the network service node that is ultimately selected/designated to process the CCR message.

After receiving CCR message 401, DSR 104 may be configured to generate a DBR request message 402. In one embodiment, DSR 104 extracts one or more mobile subscriber identifiers from the received message 401 and inserts one or more of the extracted mobile subscriber identifiers into the generated DBR request message. In this example, DSR 104 extracts the user name identifier from CCR message 401 and subsequently generates a DBR request message 402. DSR 104 may then insert the user name identifier into the generated DBR request message 402 prior to sending the request message to DBR 102. Although DBR 102 is shown in FIG. 4 to be co-located with DSR 104, DBR 102 may be hosted by a separate standalone network element without departing from the scope of the present subject matter.

Upon receiving DBR request message 402, DBR 102 uses the user name identifier contained in message 402 to access and cross-reference one or more binding records (e.g., Diameter-based binding records). For example, after cross-referencing the user name identifier (e.g., "User Name X") with the binding records stored in record database 128 (shown in FIG. 1), DBR 102 determines that the preferred network service node to process the CCR message associated with the mobile subscriber is CDF 112₁. DBR 102 then generates a DBR response message 403 that includes an identifier or address of CDF 112₁. Afterwards, DBR 102 sends the message 403 to DSR 104.

After DBR response message 403 is received by DSR 104, DSR 104 may then forward the original CCR message to the network service node designated in response message 403. As shown in FIG. 4, modified CCR message 404 (which is a modified CCR message 401) is sent to CDF 112₁ for processing.

FIG. 4 also illustrates the DSR 104 subsequently receiving a Diameter message A 405 that includes a second unique session identifier (e.g., "Session ID 2"), a user name (e.g., "User Name X"), and an IMS public identity associated with the original mobile subscriber. In response to receiving Diameter message 405, DSR 104 then accesses a local database (or a co-located DBR 102 as shown in FIG. 4) to determine a preferred network service node to process Diameter message A 405. In one embodiment, Diameter message A 405 may include another CCR message, an ACR message, an ULR message, a Diameter mobility management message, or a Diameter charging message. Although not shown in FIG. 4, DSR 104 may be configured to utilize a DBR request message (similar to message 402 described above) to query DBR 102 to determine a preferred network service node to process Diameter message A 405. In addition to determining that PCRF 114₁ is the preferred network service node to process Diameter message A 405 (e.g., by cross-referencing the user name with entries contained in the binding records), DBR 102 may also provide the previously determined network service node identification information and associated session identifier information. For example, DBR 102 may provide DSR 104 with the first session identifier (i.e., "Session ID_1") and the first network service node identifier (i.e., "CDF_1" identifying CDF 112₁) because the same user name identifier "User Name X" was used to designate CDF 112₁ as a preferred network service node for previously received CCR message 401.

After acquiring the DBR information, DSR 104 modifies the original Diameter message 405 to include the first session identifier and the first network service node identifier/identity. Namely, DSR 104 may modify the original Diameter message 405 to create a modified Diameter message A' 406 that includes the "Session ID_1" session identifier and the "serving CDF_1" identifier (which identifies CDF 112₁). DSR 104 may then route modified Diameter message A' 406 to PCRF 114₁ (as identified by a network service node identifier obtained from DBR 102).

In a similar manner, FIG. 4 illustrates the receiving of another Diameter message B 407 that includes a second unique session identifier (e.g., "Session ID_3"), a user name (e.g., "User Name X"), and an IMS private identity associated with the original mobile subscriber at DSR 104. In response to receiving Diameter message 407, DSR 104 then accesses a local database (or a co-located DBR 102 as shown in FIG. 4) to determine a preferred network service node to process Diameter message B 407. In one embodiment, Diameter message B 407 may include another CCR message, an ACR message, an ULR message, a Diameter mobility management message, or a Diameter charging message. Although not shown in FIG. 4, DSR 104 may be configured to utilize a DBR request message (similar to message 402 described above) to query DBR 102 to determine a preferred network service node to process Diameter message B 407. In addition to be used to determine that CSCF 412 is the preferred network service node to process Diameter message B 407, DBR 102 may also provide previously determined DBR information, such as network service node identification information, associated session identifier information, and mobile subscriber identifier information. For example, DBR 102 may provide DSR 104 with the first session identifier (i.e., "Session ID_1"), the first network service node identifier (i.e., "CDF_1" identifying CDF 112₁), the second session identifier (i.e., "Session ID_2"), the second network service node identifier (i.e., "PCRF_1" identifying PCRF 114₁), and/or the IMPU originally received in message 405 because the same user name identifier "User Name X" was used to designate CDF 112₁ and PCRF 114₁ as preferred network service nodes for previously received CCR message 401 and Diameter message A 405, respectively.

After acquiring the DBR information, DSR 104 may be configured to modify the original Diameter message 407 to include the first session identifier, the first network service node identifier/identity, and the IMPU identifier information associated with the mobile subscriber. Specifically, DSR 104 may modify original Diameter message 407 to create a modified Diameter message B' 408 that includes the "Session ID_1" session identifier, the "serving CDF_1" identifier (which identifies CDF 112₁), and the IMPU. Although not shown in FIG. 4, DSR 104 could have also included the second session identifier (i.e., "Session ID_2") and the second network service node identifier (i.e., "PCRF_1" identifying PCRF 114₁) in modified Diameter message B' 408. DSR 104 may then route modified Diameter message B' 408 to CSCF 412 (as identified by a network service node identifier obtained from DBR 102). DSR 104 may also be configured to modify a received Diameter signaling message determined to be directed to a CDF to include information identifying a serving PCRF of the subscriber. In general, modifying a received Diameter signaling message based on results of a DBR lookup to communicate Diameter binding information regarding a first Diameter node of a first type to a second Diameter node of a second type different from the first type is intended to be within the scope of the subject matter described herein.

FIG. 5 illustrates an exemplary table 500 depicting Binding record data used for identifying a network service node according to an embodiment of the subject matter described herein. In one embodiment, table 500 may represent at least a portion of database 128 maintained at DBR 102. Table 300 may include a plurality of mobile subscriber related identifiers 502-518 as column headers. For example, table 500 may include at least one column for each of: a Diameter session identifier 502, a user name 504, an IMPI identifier 508, an IMPU identifier 510, a SIP URI 512, an NAI 514, a mobile/dialable number 516, and a user IP address 518. Table 500 may also include a network service node column, such as a network service node identifier/address column 520. Although ten columns are depicted in FIG. 5, table 500 may include any number of columns associated with any type of identifier.

In some embodiments, binding record data may be used in determining, identifying, and/or selecting a network service node, e.g., to process a particular Diameter transaction or related Diameter messages. For example, binding record data may be used to route transactions associated with a particular user as identified by an IMSI value to a particular HSS as identified by an HSS identifier.

Figure 6:
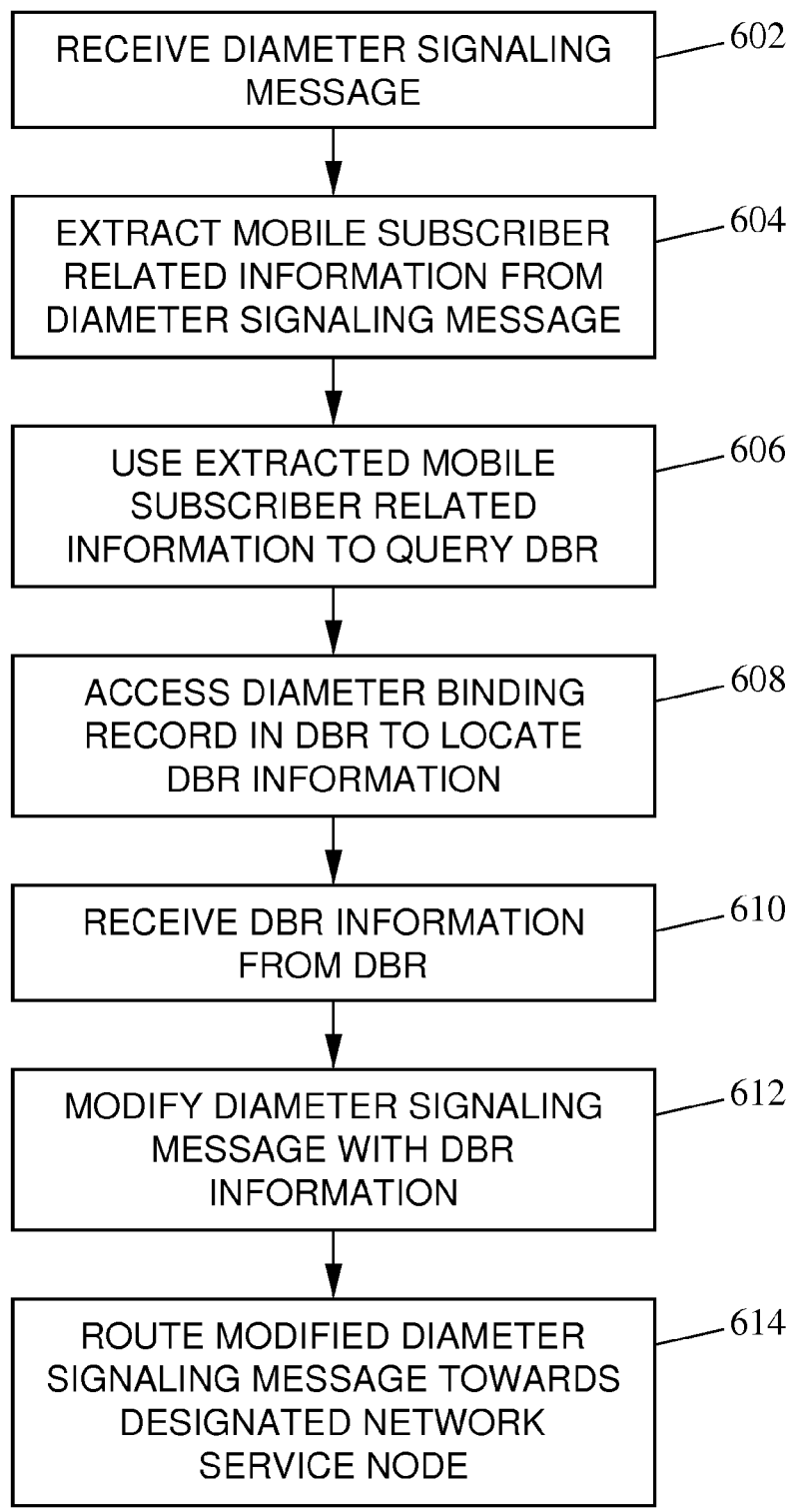
FIG. 6 is a flow chart illustrating a method for enriching a Diameter signaling message according to an embodiment of the subject matter described herein.

FIG. 6 is a flow chart illustrating a process 600 for enriching a Diameter signaling message according to an embodiment of the subject matter described herein. In block 602, a Diameter signaling message associated with a mobile subscriber is received. In one embodiment, DSR 104 receives a Diameter based request message, such as a CCR message, from a sending network node.

In block 604, mobile subscriber related information is extracted from the Diameter signaling message. In one embodiment, DSR 104 is configured to extract mobile subscriber related information from the received CCR message. For example, extracted mobile subscriber related information may include a user name associated with a particular mobile subscriber and a session identifier.

In block 606, a DBR node is queried. In one embodiment, DSR 104 may generate a query or request message (e.g., a DBR request message) that includes the extracted mobile subscriber related information. For example, DSR 104 may extract a user name and session identifier associated with a mobile subscriber from the received CCR message. DSR 104 may then be configured to generate a request or query message that includes the extracted user name and session identifier. DSR 104 may also be configured to send the request message including the user name and session identifier to DBR 102.

In block 608, a binding record in DBR 102 is accessed to locate DBR information. In one embodiment, DBR 102 may compare or cross reference the user name identifier in the received DBR query message to with the elements (e.g., identifiers/parameters) contained in the binding records stored in record database 128. Upon finding a matching element/entry in a binding record, DBR 102 generates a DBR answer message. DBR 102 may also be configured to insert additional DBR information that corresponds to the matching element in the binding record. For example, the DBR information may include a network service node associated with the mobile subscriber in addition to other mobile subscriber identifiers, network service node identifiers, and session identifiers. Also, if there are any mobile subscriber related identifiers that do not match the elements contained in the existing binding record, those unmatched mobile subscriber related identifiers may be added (i.e., provisioned to the existing binding record).

In block 610, the DBR information is received at the DSR. In one embodiment, DSR 104 receives a DBR response message containing the DBR information.

In block 612, the DSR modifies/enriches the Diameter signaling message with the DBR information. In one embodiment, DSR 104 modifies the originally received Diameter signaling message (i.e., the message received in block 602) by inserting at least a portion of the received DBR information.

In block 614, the modified Diameter signaling message is routed towards the selected/designated network service node. In one embodiment, DSR 104 routes the modified Diameter signaling message (e.g., CCR message) to the network service node associated with the network service node identifier provided by DBR 102. For example, DSR 104 may forward the modified CCR message to CDF 112₁.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for enriching a Diameter signaling message, the method comprising:
   receiving, at a Diameter routing node, a Diameter signaling message that is associated with a mobile subscriber and includes mobile subscriber related information;
   querying a Diameter binding repository (DBR) using the mobile subscriber related information to select a network service node from a plurality of network service nodes configured to process the Diameter signaling message;
   obtaining DBR information associated with the mobile subscriber from the DBR, wherein the DBR information includes an identifier associated with the selected network service node and at least one additional identifier identifying the mobile subscriber that differs from the mobile subscriber related information; and modifying the Diameter signaling message to include the at least one additional identifier identifying the mobile subscriber.

2. The method of claim 1 comprising routing the modified Diameter signaling message to the selected network service node using the identifier associated with the selected network service node.

3. The method of claim 1 wherein the DBR is co-located with the Diameter routing node.

4. The method of claim 1 wherein the DBR is implemented on a network node separate from the Diameter routing node.

5. The method of claim 1 wherein the Diameter routing node includes a Diameter signaling router (DSR), a Diameter routing agent (DRA), a Diameter proxy agent (DPA), a Diameter redirect agent, a Diameter translation agent, or a Diameter relay agent.

6. The method of claim 1 wherein the DBR information associated with the mobile subscriber includes at least one of: Diameter session-identifier information, network service node identification information, user-name information, a user Internet protocol (IP) information, IP multimedia subsystem (IMS) private identity (IMPI) information, IMS public identity (IMPU) information, session initiation protocol (SIP) uniform resource identifier (URI) information, IMS charging identifier information, mobile station international subscriber directory number (MSISDN) information, mobile/dialable number information, a session identifier, an international mobile subscriber identity (IMSI), a mobile subscriber directory number (DN), a globally unique temporary identifier (GUTI), a serving mobile switching center (MSC) address information, visitor location register (VLR) number information, serving General Packet Radio Service (GPRS) support node (SGSN) address information, SGSN number information, visited mobile country code (MCC) information, mobile network code (MNC) information, a user-name attribute value pair (AVP), a network access identifier (NAI), serving location area code information, serving cell identification information, mobile subscriber geo-location coordinate information, and tracking area information.

7. The method of claim 1 wherein each of the plurality of network service nodes includes: a network charging node, an online charging system (OCS) node, an offline charging system (OFCS) node, a charging trigger function (CTF) node, a charging gateway function (CGF) node, a charging data function (CDF) node, a policy and charging rules function (PCRF) node, a home subscriber server (HSS) node, or a home location register node (HLR).

8. The method of claim 1 wherein the network service node is selected by accessing at least one binding record stored in the DBR.

9. The method of claim 8 wherein the at least one binding record includes at least one of: a Diameter session binding, a Diameter session identifier-to-network service node association, a Diameter end to end identifier-to-network service node association, a subscriber identifier-to-network service node association, and a charging identifier-to-network service node association.

10. The method of claim 1 wherein receiving the Diameter signaling message includes receiving a credit control request (CCR) message, an accounting request (ACR) message, an update location request (ULR) message, a Diameter mobility management message, or a Diameter charging message.

11. The method of claim 1 wherein the selected service node is of a first Diameter service type, wherein the DBR information identifies an additional Diameter node of a second Diameter service type different from the first Diameter service type, and wherein modifying the Diameter signaling message includes modifying the message to include identifying information for the additional service node.

12. The method of claim 11 comprising forwarding the Diameter signaling message to the selected service node.

13. The method of claim 12 wherein the selected service node comprises a policy and charging rules function (PCRF) and wherein the additional service node comprises a charging data function (CDF).

14. The method of claim 12 wherein the selected service node comprises a charging data function (CDF) and wherein the additional service node comprises a policy and charging rules function (PCRF).

15. A system for enriching a Diameter signaling message, the system comprising:
a Diameter binding repository (DBR) configured to store binding records; and
a Diameter routing node configured to receive a Diameter signaling message that is associated with a mobile subscriber and includes mobile subscriber related information, to query the DBR using the mobile subscriber related information to select a network service node from a plurality of network service nodes configured to process the Diameter signaling message, to obtain DBR information associated with the mobile subscriber from the DBR, wherein the DBR information includes an identifier associated with the selected network service node and at least one additional identifier identifying the mobile subscriber that differs from the mobile subscriber related information, and to modify the Diameter signaling message to include the at least one additional identifier identifying the mobile subscriber.

16. The system of claim 15 wherein the Diameter routing node is configured to route the modified Diameter signaling message to the selected network service node using the identifier associated with the selected network service node.

17. The system of claim 15 wherein the DBR is co-located with the Diameter routing node.

18. The system of claim 15 wherein the DBR is implemented on a network node separate from the Diameter routing node.

19. The system of claim 15 wherein the Diameter routing node includes a Diameter signaling router (DSR), a Diameter routing agent (DRA), a Diameter proxy agent (DPA), a Diameter redirect agent, a Diameter translation agent, or a Diameter relay agent.

20. The system of claim 15 wherein the DBR information associated with the mobile subscriber includes at least one of: Diameter session-identifier information, network service node identification information, user-name information, a user Internet protocol (IP) information, IP multimedia subsystem (IMS) private identity (IMPI) information, IMS public identity (IMPU) information, session initiation protocol (SIP) uniform resource identifier (URI) information, IMS charging identifier information, mobile station international subscriber directory number (MSISDN) information, mobile/dialable number information, a session identifier, an international mobile subscriber identity (IMSI), a mobile subscriber directory number (DN), a globally unique temporary identifier (GUTI), a serving mobile switching center (MSC) address information, visitor location register (VLR) number information, serving General Packet Radio Service (GPRS) support node (SGSN) address information, SGSN number information, visited mobile country code (MCC) information, mobile network code (MNC) information, a user-name attribute value pair (AVP), a network access identifier (NAI), serving location area code information, serving cell identification information, mobile subscriber geo-location coordinate information, and tracking area information.

21. The system of claim 15 wherein each of the plurality of network service nodes includes: a network charging node, an online charging system (OCS) node, an offline charging system (OFCS) node, a charging trigger function (CTF) node, a charging gateway function (CGF) node, a charging data function (CDF) node, a policy and charging rules function (PCRF) node, a home subscriber server (HSS) node, or a home location register node (HLR).

22. The system of claim 15 wherein the network service node is selected by accessing at least one binding record stored in the DBR.

23. The system of claim 22 wherein the at least one binding record includes at least one of: a Diameter session binding, a Diameter session identifier-to-network service node association, a Diameter end to end identifier-to-network service node association, a subscriber identifier-to-network service node association, and a charging identifier-to-network service node association.

24. The system of claim 15 wherein the Diameter signaling message includes a credit control request (CCR) message, an accounting request (ACR) message, an update location request (ULR) message, a Diameter mobility management message, or a Diameter charging message.

25. The system of claim 15 wherein the selected service node is of a first Diameter service type, wherein the DBR information identifies an additional Diameter node of a second Diameter service type different from the first Diameter service type, and wherein the Diameter routing node is configured to modify the Diameter signaling message to include identifying information for the additional service node.

26. The system of claim 25 wherein the Diameter routing node is configured to forward the Diameter signaling message to the selected service node.

27. The system of claim 26 wherein the selected service node comprises a policy and charging rules function (PCRF) and wherein the function additional service node comprises a charging data function (CDF).

28. The system of claim 26 wherein the selected service node comprises a charging data function (CDF) and wherein the function additional service node comprises a policy and charging rules function (PCRF).

29. A non-transitory computer readable medium comprising computer executable instructions embodied in a computer readable medium that when executed by a processor of a computer control the computer to perform steps comprising:
  receiving, at a Diameter routing node, a Diameter signaling message that is associated with a mobile subscriber and includes mobile subscriber related information;
  querying a Diameter binding repository (DBR) using the mobile subscriber related information to select a network service node from a plurality of network service nodes configured to process the Diameter signaling message;
  obtaining DBR information associated with the mobile subscriber from the DBR, wherein the DBR information includes an identifier associated with the selected network service node and at least one additional identifier identifying the mobile subscriber that differs from the mobile subscriber related information; and
  modifying the Diameter signaling message to include the at least one additional identifier identifying the mobile subscriber.

* * * * *